US011166291B2

(12) United States Patent
Nam et al.

(10) Patent No.: US 11,166,291 B2
(45) Date of Patent: Nov. 2, 2021

(54) ADAPTATION OF CHANNEL MONITORING FOR UNLICENSED FREQUENCY SPECTRUM BAND OPERATION

(71) Applicant: QUALCOMM Incorporated, San Diego, CA (US)

(72) Inventors: Wooseok Nam, San Diego, CA (US); Tao Luo, San Diego, CA (US); Xiaoxia Zhang, San Diego, CA (US); Arumugam Chendamarai Kannan, San Diego, CA (US); Olufunmilola Omolade Awoniyi-Oteri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/672,803

(22) Filed: Nov. 4, 2019

(65) Prior Publication Data
US 2020/0205163 A1    Jun. 25, 2020

Related U.S. Application Data

(60) Provisional application No. 62/782,249, filed on Dec. 19, 2018.

(51) Int. Cl.
| | | |
|---|---|---|
| *H04L 12/28* | (2006.01) | |
| *H04W 72/08* | (2009.01) | |
| *H04W 76/27* | (2018.01) | |
| *H04W 72/04* | (2009.01) | |
| *H04W 24/08* | (2009.01) | |
| *H04J 1/16* | (2006.01) | |

(52) U.S. Cl.
CPC ......... *H04W 72/085* (2013.01); *H04W 24/08* (2013.01); *H04W 72/042* (2013.01); *H04W 76/27* (2018.02)

(58) Field of Classification Search
CPC ............... H04W 16/14; H04W 7/0816; H04W 72/0453; H04W 74/0808; G01S 7/023
(Continued)

(56) References Cited

U.S. PATENT DOCUMENTS

2019/0029047 A1*   1/2019   Zhu ................... H04W 74/0816
2019/0090126 A1*   3/2019   Hayashi ............ H04W 72/0446
(Continued)

FOREIGN PATENT DOCUMENTS

WO    WO-2018103002 A1    6/2018

OTHER PUBLICATIONS

International Search Report and Written Opinion—PCT/US2019/059823—ISA/EPO—dated Mar. 11, 2020 (190800WO).
(Continued)

*Primary Examiner* — John Pezzlo
(74) *Attorney, Agent, or Firm* — Holland & Hart LLP

(57) ABSTRACT

Methods, systems, and devices for wireless communications are described. A user equipment (UE) may receive signaling from a base station that identifies a set of channel monitoring parameters associated with monitoring an unlicensed frequency spectrum band. The set of channel monitoring parameters may include at least one of a length of a channel monitoring window, a periodicity of the channel monitoring window, a carrier or a bandwidth part of the channel monitoring window, or a combination thereof. The UE may identify a termination of a transmission opportunity in the unlicensed frequency spectrum band, and monitor the unlicensed frequency spectrum band following the termination of the transmission opportunity using the set of channel monitoring parameters.

30 Claims, 19 Drawing Sheets

(58) Field of Classification Search
USPC .......................................... 370/252, 329, 445
See application file for complete search history.

(56) References Cited

U.S. PATENT DOCUMENTS

| | | | | |
|---|---|---|---|---|
| 2019/0150170 | A1* | 5/2019 | Park | H04W 74/00 370/329 |
| 2019/0208482 | A1* | 7/2019 | Tooher | H04L 27/2607 |
| 2019/0349799 | A1* | 11/2019 | Siomina | H04L 1/1887 |
| 2019/0357185 | A1* | 11/2019 | Kwak | H04L 5/0094 |

OTHER PUBLICATIONS

QUALCOMM Incorporated: "DL Signals and Channels for NR-U", 3GPP Draft, 3GPP TSG RAN WG1 Meeting #95, R1-1813411 7.2.2.3.1 DL Signals and Channels for NR-U, 3rd Generation Partnership Project (3GPP), Mobile Competence Centre, 650, Route Des Lucioles, F-06921 Sophia-Antipolis Cedex, Fran, vol. RAN WG1, No. Spokane, USA, Nov. 12, 2018-Nov. 16, 2018, Nov. 3, 2018 (Nov. 3, 2018), XP051479733, pp. 1-39, Retrieved from the Internet: URL: http://www.3gpp.org/ftp/tsg%5Fran/WG1%5FRL1/ TSGR1%5F95/Docs/R1%2D1813411%2Ezip, [retrieved on Nov. 3, 2018], Sections 3.1, 3.2, p. 3-p. 5.

Samsung: "Frequency Domain Aspects of SI Message TX/RX in NR-U", 3GPP Draft, 3GPP TSG-RAN2 104, R2-1816316 _Frequency Domain Aspects of SI Message TX-RX in NR-U, 3rd Generation Partnership Project (3GPP), Mobile Competence Centre, 650, Route Des Lucioles, F-06921 Sophia-Antipolis CE, vol. RAN WG2, No. Spokane, USA, Nov. 12, 2018-Nov. 16, 2011, Nov. 1, 2018 (Nov. 1, 2018), XP051480286, Retrieved from the Internet: URL: http://www.3gpp.org/ftp/tsg%5Fran/WG2%5FRL2/TSGR2% 5F104/Docs/R2%2D1816316%2Ezip [retrieved on Nov. 1, 2018], Discussion, p. 2, paragraph 2—p. 3, figures 1-2.

* cited by examiner

ADAPTATION OF CHANNEL MONITORING FOR UNLICENSED FREQUENCY SPECTRUM BAND OPERATION

CROSS REFERENCE

The present Application for Patent claims the benefit of U.S. Provisional Patent Application No. 62/782,249 by NAM, et al., entitled "ADAPTATION OF CHANNEL MONITORING FOR UNLICENSED FREQUENCY SPECTRUM BAND OPERATION," filed Dec. 19, 2018, assigned to the assignee hereof, and expressly incorporated herein.

BACKGROUND

The following relates generally to wireless communications, and more specifically to adaptation of channel monitoring for unlicensed frequency spectrum band operation.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipments (UEs). The wireless multiple-access communications system may employ technologies that support licensed frequency spectrum band operation and unlicensed frequency spectrum band operation for the base stations, network access nodes, or UEs.

SUMMARY

A communication device, which may be otherwise known as a user equipment (UE) may operate within an unlicensed frequency spectrum band in a wireless communications system. In some examples, when operating within an unlicensed frequency spectrum band, communications for the communication device may be subject to a transmission opportunity. Within the transmission opportunity, operating behaviors of the communication device may be similar to licensed frequency spectrum band operation. Outside the transmission opportunity, however, the communication device may monitor a communication channel to detect a transmission opportunity. In some examples, monitoring of the communication channel according to some techniques may result in inefficient use of resources. To improve efficiency of the monitoring of the communication channel and reduce use of resources of the communication device, it may be beneficial for the communication device to monitor the communication channel (e.g., in unlicensed frequency spectrum band) according to a set of received (or selected) channel monitoring parameters.

DETAILED DESCRIPTION

Figure 1:
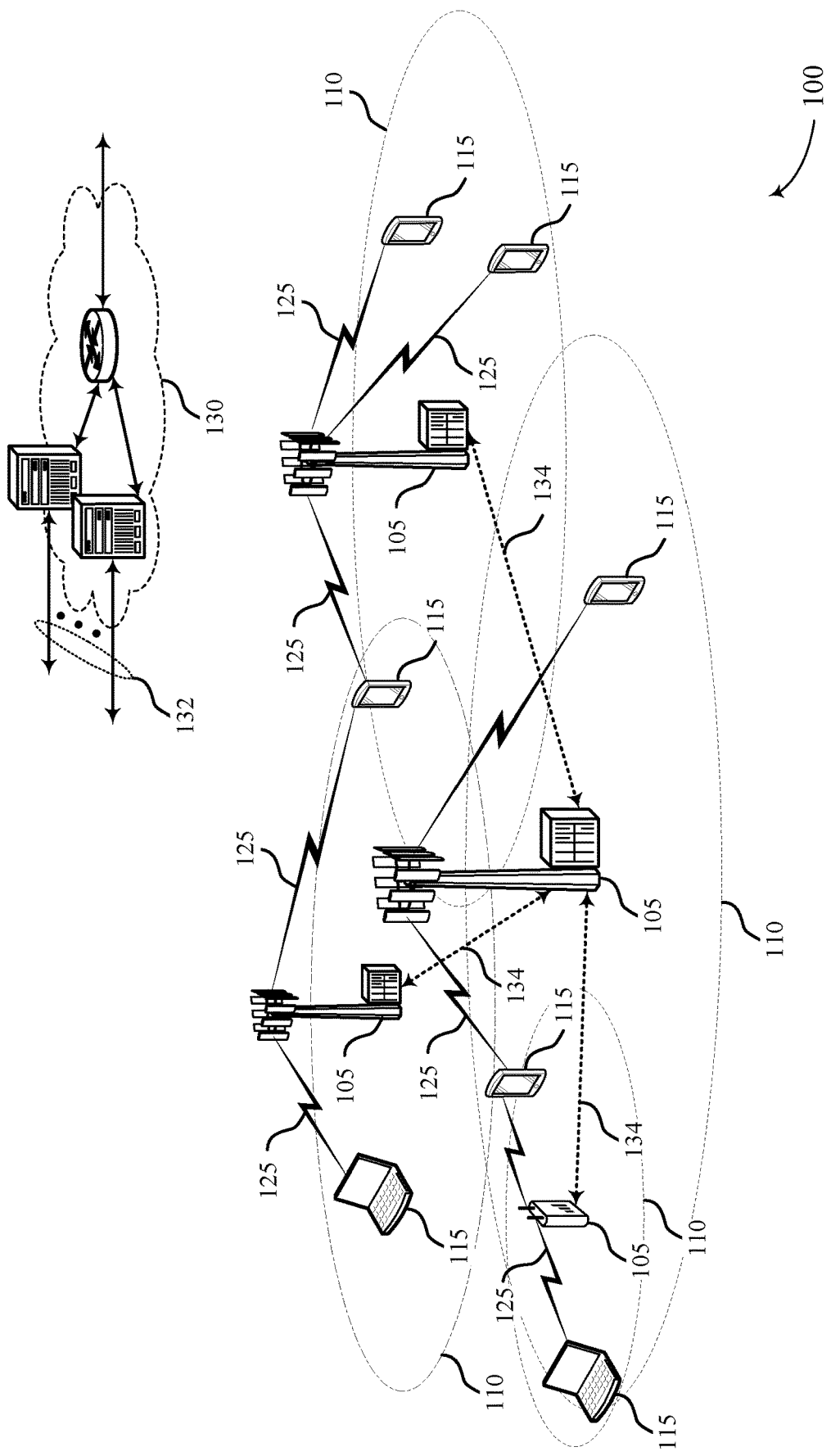
FIGS. 1 and 2 illustrate an example of a wireless communications system that supports adaptation of channel monitoring for unlicensed frequency spectrum band operation in accordance with aspects of the present disclosure.

A wireless communications system may include a number of base stations supporting communication for multiple communication devices, which may be otherwise known as user equipments (UEs). In the wireless communications system, a base station and a UE may operate within an unlicensed frequency spectrum band. In the unlicensed frequency spectrum band, the base station may perform a contention-based scheme, such as listen-before-talk, on one or more channels to acquire at least one channel for wireless communications in the unlicensed frequency spectrum band. The UE may have a different unlicensed frequency spectrum band operation compared to a licensed frequency spectrum band operation. For example, when operating within an unlicensed frequency spectrum band, communications for the UE may depend on a transmission opportunity. A transmission opportunity may extend for a channel occupancy time, in which the UE may receive downlink communications from the base station or transmit uplink communications to the base station on an acquired channel (e.g., based on the listen-before-talk performed by the base station).

Within the transmission opportunity, the operating behaviors of the UE may be similar to, or the same as, operating behaviors within a licensed frequency spectrum band. For example, the UE may transmit uplink communications (e.g., physical uplink control channel (PUCCH), physical uplink shared channel (PUSCH), references signals, etc.) or receive downlink communications (e.g., physical downlink control channel (PDCCH), reference signals, etc.) as configured and scheduled. Unlike licensed frequency spectrum band operation, outside the transmission opportunity, the UE may keep monitoring one or more channels outside of the transmission opportunity. For example, the UE may monitor the one or more channels continuously or occasionally (e.g., when in sleep mode to save power) during initial signal monitoring occasions or channel activity monitoring windows to evaluate whether a transmission opportunity is available on at least one channel (e.g., an acquired channel) for wireless communications.

Although the UE's behavior of communicating during transmission opportunities supports reducing or avoiding interference between wireless communications systems sharing a same unlicensed frequency spectrum band (e.g., interference between LTE/NR and Wi-Fi wireless communications systems), the UE's behavior for monitoring for the transmission opportunities may result in unnecessary power consumption. That is, a UE may remain in an active mode for extended lengths to monitor for a transmission opportunity, which may prevent the UE from going into a deep sleep mode. The reason the UE continues to monitor for the transmission opportunity indefinitely is because the transmission opportunity can start at any moment. That is, because the start of a transmission opportunity is opportunistic (e.g., contention-based), the UE may be unaware of when the transmission opportunity may start and when the UE may begin uplink transmission or downlink reception. As a result, present UE behavior for monitoring channels to identify transmission opportunities may be (based on UE implementation) an inefficient use of UE resources (e.g., power consumption).

To improve efficiency of channel monitoring (e.g., outside of a channel occupancy time) and decrease the use of resources, it may be beneficial for the UE to monitor the channel (e.g., in unlicensed frequency spectrum band) according to a set of adaptive channel monitoring parameters. For example, the UE may receive signaling from a base station that identifies a set of channel monitoring parameters associated with monitoring an unlicensed frequency spectrum band. In some examples, the UE may receive the signaling as part of a connection procedure via radio resource control signaling or during a transmission opportunity via dynamic signaling, as described herein. The set of channel monitoring parameters may include at least one of a length of a channel monitoring window, a periodicity of the channel monitoring window, a carrier or a bandwidth part of the channel monitoring window, or a combination thereof. The UE may therefore monitor the unlicensed frequency spectrum band (following a termination of a transmission opportunity) using the set of channel monitoring parameters. By using the set of channel monitoring parameters to monitor the unlicensed frequency spectrum band, the UE may reduce its monitoring outside a transmission opportunity, as well as reduce its power consumption.

Aspects of the disclosure are initially described in the context of a wireless communications system. Aspects of the disclosure are illustrated by and described with reference to timelines and process flows. Aspects of the disclosure are further illustrated by and described with reference to apparatus diagrams, system diagrams, and flowcharts that relate to adaptation of channel monitoring for unlicensed frequency spectrum band operation.

FIG. 1 illustrates an example of a wireless communications system 100 that supports adaptation of channel monitoring for unlicensed frequency spectrum band operation in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band.

The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the radio resource control protocol layer may provide establishment, configuration, and maintenance of an radio resource control connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable. Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some examples of the wireless communications system 100, base stations 105 and UEs 115 may operate within an unlicensed frequency spectrum band. In these examples, the UEs 115 may have different operating behaviors compared to operating behaviors in licensed frequency spectrum bands. For example, when operating within an unlicensed frequency spectrum band, communications with the base stations 105 for the UEs 115 may depend on a transmission opportunity in which the UEs 115 may receive downlink communications or transmit uplink communications. Within a transmission opportunity, the operating behaviors of the UEs 115 may be similar to operating behaviors in the licensed frequency spectrum band. Outside the transmission opportunity, however, the UEs 115 may monitor a communication channel (e.g., communication links 125) to detect a transmission opportunity. In some examples, monitoring of the communication channel (e.g., communication links 125) by the UEs 115 may extend indefinitely because the UEs 115 may be unaware of timing information of a transmission opportunity (e.g., a start or an end). As a result, the UEs 115 may keep monitoring the communication channel (e.g., communication links 125) for an initial signal from at least one base station 105 indicating a transmission opportunity. To improve efficiency of monitoring of the communication links 125 and reduce the use of resources of the UEs 115, it may be beneficial for the UEs 115 to monitor the communication links 125 (e.g., unlicensed frequency spectrum bands) according to a set of channel monitoring parameters.

Figure 2:
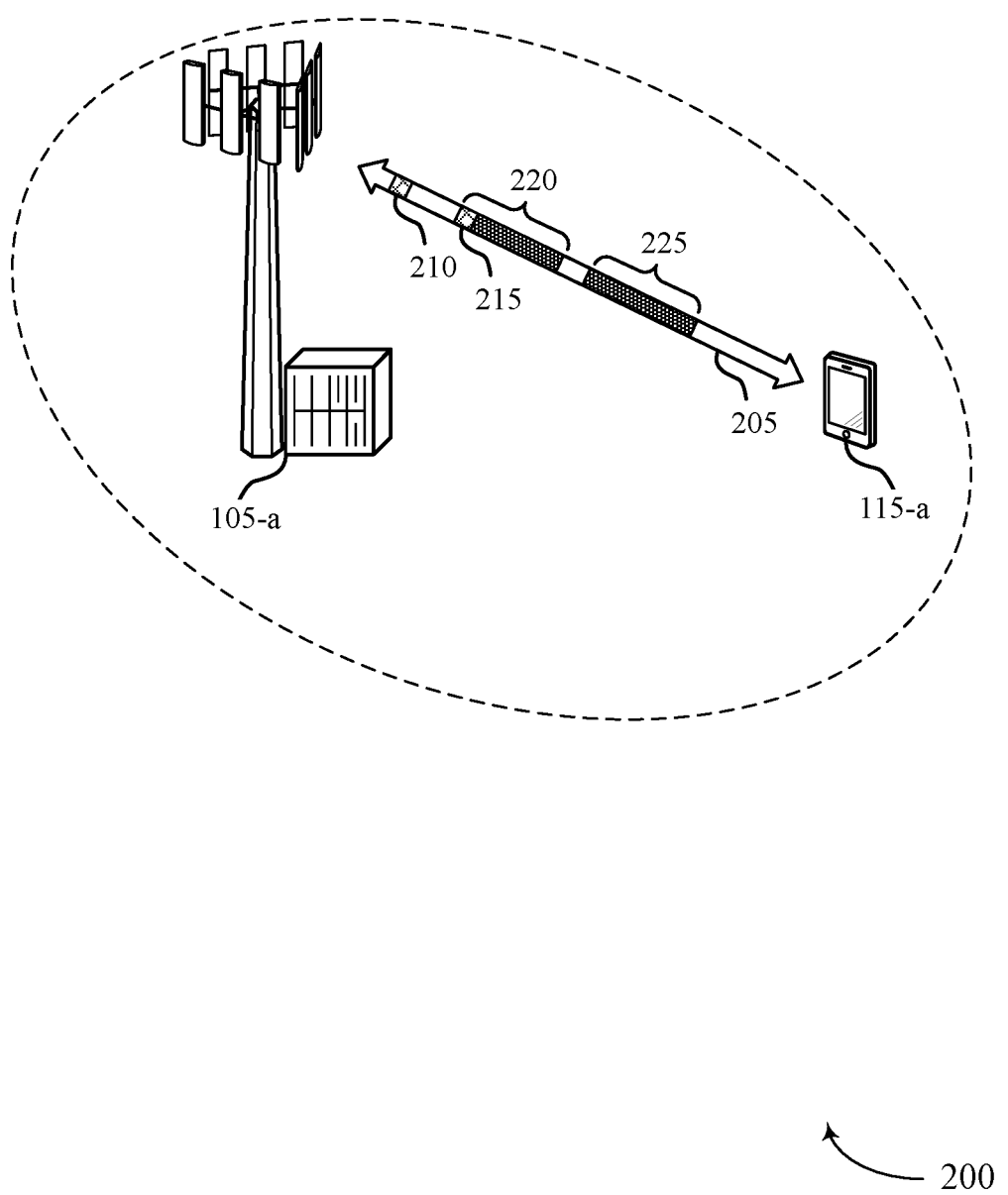

FIG. 2 illustrates an example of a wireless communications system 200 that supports adaptation of channel monitoring for unlicensed frequency spectrum band operation in accordance with aspects of the present disclosure. The wireless communications system 200 may include a base station 105-a and a UE 115-a, which may be examples of the corresponding devices described with reference to FIG. 1. In some examples, the wireless communications system 200 may implement aspects of the wireless communications system 100. For example, the base station 105-a and the UE 115-a may support improvements in channel monitoring for unlicensed frequency spectrum band operation.

The base station 105-a may perform a connection procedure (e.g., a radio resource control procedure such as a cell acquisition procedure, a random access procedure, a radio resource control connection procedure, a radio resource control configuration procedure, etc.) with the UE 115-a. The base station 105-a and the UE 115-a may be configured with multiple antennas, which may be used for directional or beamformed transmissions. As part of the connection procedure, the base station 105-a and the UE 115-a may establish a communication link 205 for wired or wireless communication.

The base station 105-a may determine a set of channel monitoring parameters related to monitoring an unlicensed frequency spectrum band. The set of channel monitoring parameters may be based on a group UE-common configuration or a UE-specific configuration. In some examples, the set of channel monitoring parameters may include at least one of a length of a channel monitoring window, a periodicity of the channel monitoring window, a carrier or a bandwidth part of the channel monitoring window, or a combination thereof. The base station 105-a may, in some examples, determine the set of channel monitoring parameters according to UE assistance information (e.g., traffic load, power level, etc.). For example, the UE 115-a may request the base station 105-a for a specific configuration (e.g., set of channel monitoring parameters) based on a traffic load, a power status, or the like.

In some examples, the base station 105-a may transmit signaling 210 that identifies the set of channel monitoring parameters to the UE 115-a, as part of the connection procedure (via radio resource control signaling). In some examples, the base station 105-a may transmit signaling 210 that identifies the set of channel monitoring parameters to the UE 115-a within a licensed frequency spectrum band (e.g., for licensed-assisted access (LAA)). For example, the base station 105-a and the UE 115-a may have multiple communication links to support both unlicensed frequency spectrum band(s) and licensed frequency spectrum band(s). Alternatively, in some examples, the signaling 210 may be in a standalone unlicensed frequency spectrum band. In this example, the initial access and connection setup may be performed in the unlicensed frequency spectrum band. In some examples, the base station 105-a may alternatively or additionally transmit signaling 215 that identifies the set of channel monitoring parameters to the UE 115-a during a transmission opportunity 220 (e.g., via dynamic signaling). The base station 105-a may include the set of channel monitoring parameters in a control message (e.g., radio resource control message, downlink control information, MAC CE, etc.) based on the type of signaling (e.g., dynamic or non-dynamic).

The signaling 210, 215 may, in some examples, include an index mapping to a lookup entry in a set of lookup entries. The set of lookup entries may include the set of channel monitoring parameters, for example, a length of a channel monitoring window, a periodicity of the channel monitoring window (e.g., shorter periodicity for improved latency or longer periodicity for power savings), a carrier or a bandwidth part of the channel monitoring window, among others. The channel monitoring window may be associated with a set of PDCCH monitoring occasions, a set of initial signal monitoring occasions, a set of reference signal monitoring occasions, a set of beacon signal monitoring occasions, a set of wakeup signal monitoring occasions, or the like. Therefore, the UE 115-a may be configured with a lookup table having a set of lookup entries corresponding to channel monitoring parameters.

The lookup table may, in some example, be a relational database that may be stored locally at the UE 115-a. Upon receiving an index (e.g., the base station 105-a may indicate an index in the lookup table via dynamic signaling (e.g., downlink control information, MAC CE)), the UE 115-a may map the index to a lookup entry (e.g., one or more channel monitoring parameter(s)) in a lookup table and configure (or adapt) the monitoring of a channel in an unlicensed frequency spectrum band according to the mapped channel monitoring parameter(s). The UE 115-a may, in some examples, autonomously select its own channel monitoring parameter that are within a range of channel monitoring parameters or sets provided by the base station 105-a.

Following reception or selection of channel monitoring parameters, the UE 115-a may monitor a channel in an unlicensed frequency spectrum band using at least one channel monitoring parameter of the received (or mapped) set. In an example where the set of channel monitoring parameters are provided during a connection procedure, the UE 115-a may monitor a channel in an unlicensed frequency spectrum band using at least one channel monitoring parameter of the received set for the transmission opportunity 220. Alternatively, in another example where the set of channel monitoring parameters are provided during the transmission opportunity 220 via dynamic signaling, the UE 115-a may identify a termination of the transmission opportunity 220, and monitor a channel in an unlicensed frequency spectrum band, using at least one channel monitoring parameter of the received set, for a (subsequent) transmission opportunity 225. In some examples, the UE 115-a may update the channel monitoring parameter for monitoring the channel in the unlicensed frequency spectrum band for the transmission opportunity 225. For example, the UE 115-a may receive new sets of channel monitoring parameters during the same or different transmission opportunities, and update the set of channel monitoring parameters accordingly. As such, the UE 115-a may change its channel monitoring parameters in and out of transmission opportunities, respectively.

Adapting channel monitoring for unlicensed frequency spectrum band may provide benefits and enhancements to the operation of the UE 115-a. For example, by providing a set of channel monitoring parameters, the operational characteristics, such as power consumption, processor utilization, and memory usage related to channel monitoring for unlicensed frequency spectrum band operation, may be reduced. Adapting channel monitoring for unlicensed frequency spectrum band may also provide efficiency to the UE 115-a by reducing latency associated with processes related to wireless communications, and more specifically to channel monitoring for unlicensed frequency spectrum band operation.

Figure 3:
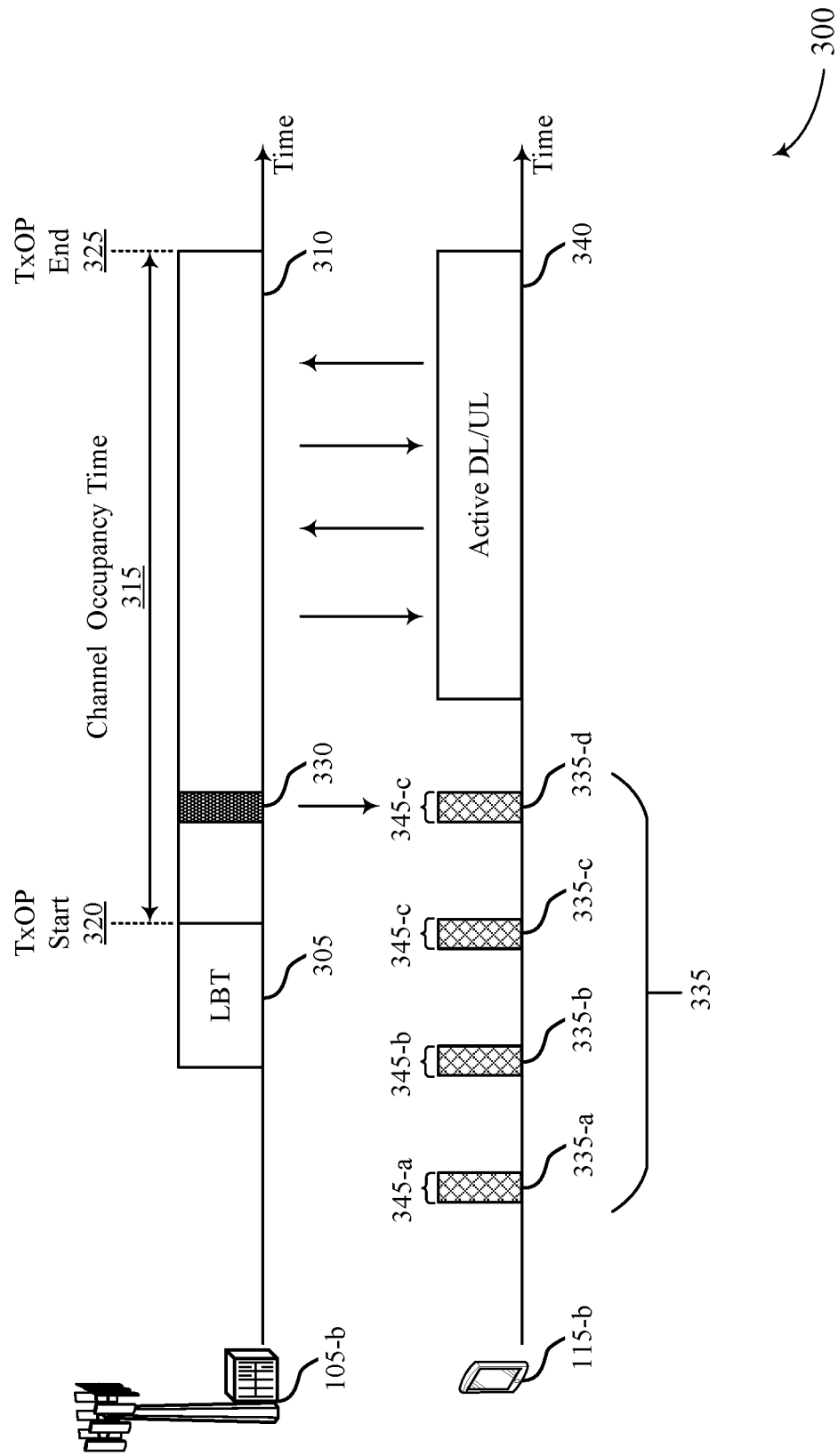
FIGS. 3 and 4 illustrate example timelines that support adaptation of channel monitoring for unlicensed frequency spectrum band operation in accordance with aspects of the present disclosure.

FIG. 3 illustrates an example of a timeline 300 that supports adaptation of channel monitoring for unlicensed frequency spectrum band operation in accordance with aspects of the present disclosure. The timeline 300 may include a base station 105-b and a UE 115-b, which may be examples of the corresponding devices described with reference to FIGS. 1 and 2. In some examples, the timeline 300 may implement aspects of the wireless communications systems 100 and 200. For example, the base station 105-b and the UE 115-b may operate within an unlicensed frequency spectrum band and support improvements in channel monitoring for the unlicensed frequency spectrum band operation.

When operating in an unlicensed frequency spectrum band, the base station 105-b (or the UE 115-b) may support a contention-based channel access scheme to acquire a communication channel in the unlicensed frequency spectrum band. For example, the base station 105-b may perform a listen-before-talk 305 on one or more channels to acquire at least one channel in an unlicensed frequency spectrum band for wireless communications with the UE 115-b. In some examples, acquiring at least one channel in an unlicensed frequency spectrum band according to the listenbefore-talk 305 may result in a transmission opportunity 310 for the base station 105-*b* and the UE 115-*b*. The transmission opportunity 310 may extend for a channel occupancy time 315, in which the UE 115-*b* may have either or both active downlink and uplink communications 340. For example, the UE 115-*b* may receive downlink communication from the base station 105-*b* or transmit uplink communication to the base station 105-*b* on the acquired channel (e.g., based on the listen-before-talk 305). Therefore, when operating in an unlicensed frequency spectrum band, communication for the UE 115-*b* may be subject to the transmission opportunity 310, and more specifically, to the channel occupancy time 315.

The UE 115-*b* may monitor one or more channels in the unlicensed frequency spectrum band to identify (detect) the transmission opportunity 310. For example, the UE 115-*b* may monitor one or more channels in the unlicensed frequency spectrum band based on a length 345 of each channel monitoring window 335 (e.g., a length 345-*a* of a channel monitoring window 335-*a*, a length 345-*b* of a channel monitoring window 335-*b*, a length 345-*c* of a channel monitoring window 335-*c*, and a length 345-*d* of a channel monitoring window 335-*d*) or a periodicity (interval or period) of channel monitoring windows 335 (e.g., channel monitoring windows 335-*a* through 335-*d*). In some examples, the base station 105-*b* may signal a specific channel monitoring periodicity to the UE. The length 345 of each channel monitoring window 335 may be uniform (the same) or different in length from a subsequent or following monitoring window 335. For example, the length 345-*a* of the channel monitoring window 335-*a* may be longer than the length 345-*b* of the channel monitoring window 335-*b*. Alternatively, the length 345-*a* of the channel monitoring window 335-*a* may be shorter than the length 345-*b* of the channel monitoring window 335-*b*. The length of each channel monitoring window 335 may be defined by a unit in time (e.g., symbols, slot, etc.).

In some examples, the UE 115-*b* may monitor one or more channels in the unlicensed frequency spectrum band continuously or at least occasionally according to the channel monitoring window(s) 335 in order to identify a transmission opportunity (e.g. transmission opportunity 310). This continuous or frequent monitoring may be an inefficient use of resources for the UE 115-*b*. For example, the UE 115-*b* may remain in an active mode for extended times to monitor one or more channels, which may prevent the UE 115-*b* from switching into a deep sleep mode. The reason the UE 115-*b* continues to monitor the one or more channels indefinitely is because the transmission opportunity 310 can start at any moment. That is, because a start 320 of the transmission opportunity 310 is opportunistic (based on the listen-before-talk 305), the UE 115-*b* may be unaware of the start 320 or end 325 of the transmission opportunity 310. Additionally, the UE 115-*b* may be unaware of when the UE 115-*b* may begin the active downlink and uplink communications 340.

To resolve these challenges, improve efficiency of the monitoring of a channel in an unlicensed frequency spectrum band (e.g., and outside of the channel occupancy time 315) and reduce use of resources of the UE 115-*b*, it may be beneficial for the UE 115-*b* to monitor a channel according to a set of channel monitoring parameters. For example, the UE 115-*b* may monitor an unlicensed frequency spectrum band according to one or more of a length of a channel monitoring window 335, a periodicity of the channel monitoring windows 335-*a* through 335-*d*, a carrier or a bandwidth part of the channel monitoring window 335, or a combination thereof. In some examples, when the transmission opportunity 310 is initiated by the base station 105-*b*, the base station 105-*b* may transmit signaling 330 (e.g., an initial signal or an activity indication) to indicate the start 320 of the transmission opportunity 310 to its serving UEs (e.g., UE 115-*b*). The UE 115-*b* may receive the signaling 330 based on the channel monitoring window(s) 335. For example, the UE 115-*b* may receive the signaling 330 during channel monitoring window 335-*d*. The channel monitoring window(s) 335 may include at least one of a set of PDCCH monitoring occasions, a set of initial signal monitoring occasions, a set of reference signal monitoring occasions, a set of beacon signal monitoring occasions, or a set of wakeup signal monitoring occasions, among others. In some examples, the signaling 330 may include a set of channel monitoring parameters associated with monitoring a channel in an unlicensed frequency spectrum band, such as at least one of a length of a channel monitoring window 335, a periodicity of the channel monitoring windows 335, a carrier or a bandwidth part of the channel monitoring window 335, or a combination thereof, following a termination of the transmission opportunity 310.

In some examples, upon termination of the transmission opportunity 310, the UE 115-*b* may continue to monitor the channel in the unlicensed frequency spectrum band according to the set of channel monitoring parameters. This may result in inefficient use of resources of the UE 115-*b*. For example, a subsequent transmission opportunity may be available sooner or later than the transmission opportunity 310, and the present set of channel monitoring parameters may not account for this change. However, the base station 105-*b* may be aware of these changes to the channel, and indicate the changes based on an updated set of channel monitoring parameters to the UE 115-*b*. As a result, the UE 115-*b* may adapt its channel monitoring for unlicensed frequency spectrum band in and out of transmission opportunities. That is, at the start 320 of the transmission opportunity 310, the UE 115-*b* may detect channel activity (e.g., or via signaling 330) and change its behavior (e.g., switch into active mode) according to a set of channel monitoring parameters included in the signaling 330. At the end 325 of the transmission opportunity 310, the UE 115-*b* may determine the end 325 of the transmission opportunity 310 based on an indication (e.g., signaling including updated set of channel monitoring parameters) from the base station 105-*b* or by detecting the channel activity, and yet again change its behavior (e.g., switch into sleep mode) according to an adapted set of channel monitoring parameters.

Adapting channel monitoring for unlicensed frequency spectrum band may provide benefits and enhancements to the operation of the UE 115-*b*. For example, by providing a set of channel monitoring parameters, the operational characteristics, such as power consumption, processor utilization, and memory usage related to channel monitoring for unlicensed frequency spectrum band operation may be reduced. Adapting channel monitoring for unlicensed frequency spectrum band may also provide efficiency to the UE 115-*b* by reducing latency associated with processes related to wireless communications, and more specifically to channel monitoring for unlicensed frequency spectrum band operation.

Figure 4:
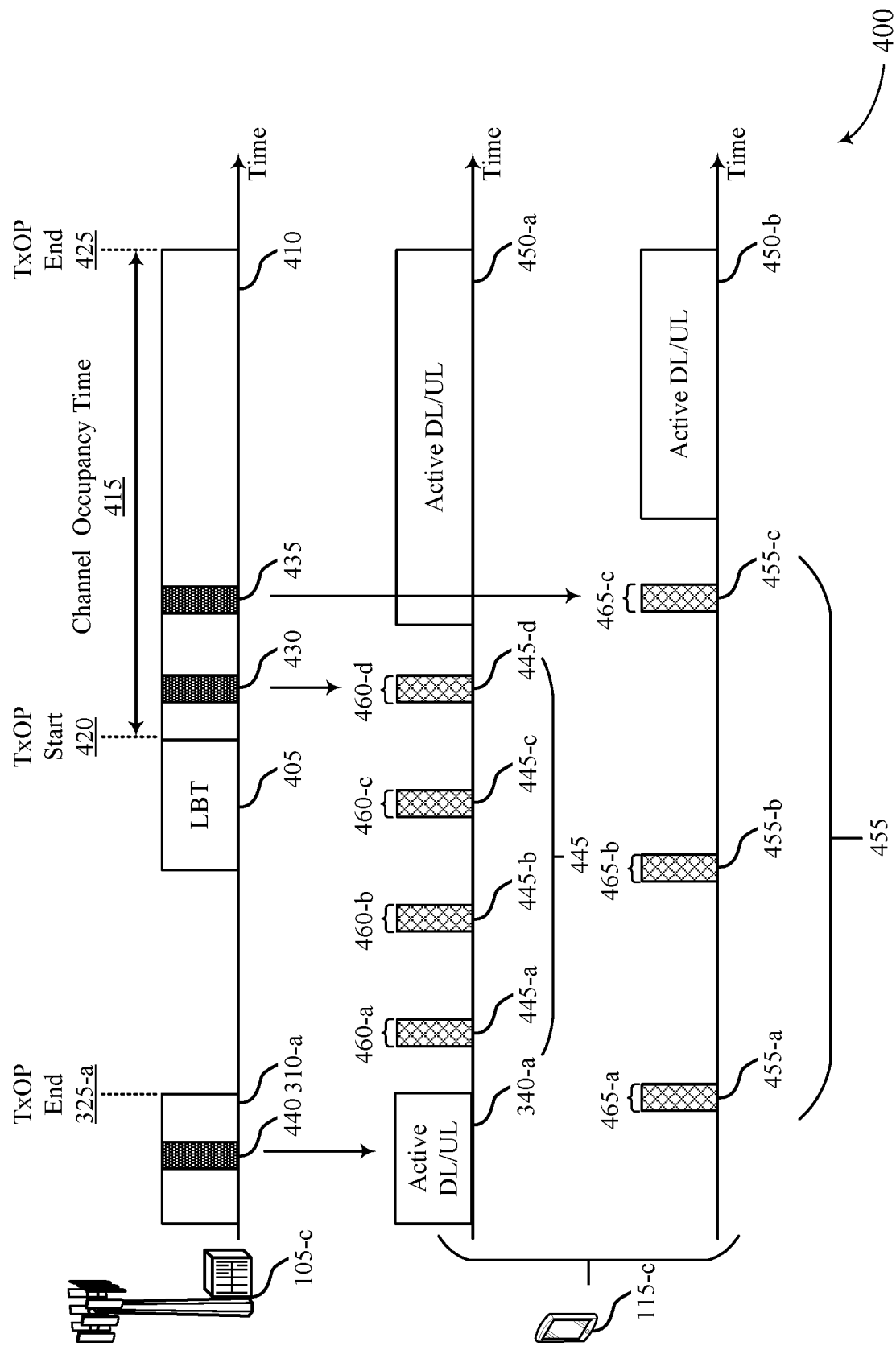

FIG. 4 illustrates an example of a timeline 400 that supports adaptation of channel monitoring for unlicensed frequency spectrum band operation in accordance with aspects of the present disclosure. In some examples, the timeline 400 may implement aspects of the wireless communications systems 100 and 200. The timeline 400 may include a base station 105-*c* and a UE 115-*c*, which may be examples of the corresponding devices described with reference to FIGS. 1 and 2. In some examples, the timeline 400 may implement aspects of the wireless communications systems 100 and 200. For example, the base station 105-*c* and the UE 115-*c* may operate within an unlicensed frequency spectrum band and support improvements in channel monitoring for the unlicensed frequency spectrum band operation.

In some examples, upon an end 325-*a* of a transmission opportunity 310-*a*, which may be examples of the corresponding transmission opportunity 310 described with reference to FIG. 3, the UE 115-*c* may continue to monitor a channel in an unlicensed frequency spectrum band according to a previous set of channel monitoring parameters. This may result in wasteful use of resources of the UE 115-*c*. For example, a subsequent transmission opportunity may be available sooner or later than expected, and the previous set of channel monitoring parameters may be stale for this variation. To resolve this problem, the base station 105-*c* may provide an updated set of channel monitoring parameters to the UE 115-*c*, or the UE 115-*c* may select an updated set of channel monitoring parameters from a set of channel monitoring parameters (e.g., stored locally in memory). As a result, the UE 115-*c* may adapt its channel monitoring for unlicensed frequency spectrum band during, before, or after transmission opportunities.

By way of example, the base station 105-*c* may transmit signaling 440 (e.g., dynamic signaling) during and before the end 325-*a* of the transmission opportunity 310-*a*. The signaling may include a (new, updated, or adapted) set of channel monitoring parameters, which the UE 115-*c* may receive during active downlink and uplink communications 340-*a*. The UE 115-*c* may adapt its channel monitoring for unlicensed frequency spectrum band based on the set of channel monitoring parameters included in the signaling 440. For example, the UE 115-*c* may adjust a length 460,465 of each channel monitoring window 445, 455 or a periodicity (interval or period) of each channel monitoring windows 445, 455 (e.g., channel monitoring windows 335-*a* through 335-*d*). In some examples, the length 460 and periodicity of channel monitoring windows 445 may be shorter for early detection of a transmission opportunity (e.g., transmission opportunity 410) and reduced latency. Alternatively, length 465 and periodicity of channel monitoring windows 455 may be longer for later detection of a transmission opportunity (e.g., transmission opportunity 410) and power saving for the UE 115-*c*.

With reference to FIG. 4, the base station 105-*c* may perform a listen-before-talk 405 on one or more channels to acquire at least one channel in an unlicensed frequency spectrum band for wireless communications with the UE 115-*c*. In some examples, acquiring at least one channel in an unlicensed frequency spectrum band according to the listen-before-talk 405 may result in a transmission opportunity 410 for the base station 105-*c* and the UE 115-*c*. The transmission opportunity 410 may extend for a channel occupancy time 415 (e.g., having have a start 420 and an end 425), in which the UE 115-*c* may have either or both active downlink and uplink communications 450-*a*, 450-*b*. For example, the UE 115-*c* may receive downlink communication from the base station 105-*c* or transmit uplink communication to the base station 105-*c* on the acquired channel (e.g., based on the listen-before-talk 405).

According to the adapted channel monitoring for unlicensed frequency spectrum band included in the signaling 440, the UE 115-*c* may receive (early detection of) signaling 430 indicating a start 420 of the transmission opportunity 410 and additional information (e.g., updated channel monitoring parameters). Alternatively, based on the adapted channel monitoring for unlicensed frequency spectrum band included in the signaling 440, the UE 115-*c* may receive (later detection of) signaling 435 indicating the start 420 of the transmission opportunity 410 and additional information (e.g., updated channel monitoring parameters). The behavior of the UE 115-*c* may therefore be adaptable according to adaptive channel monitoring parameters. As a result, adapting channel monitoring for unlicensed frequency spectrum band may provide benefits and enhancements to the operation (e.g., power consumption, processor utilization, and memory usage related to channel monitoring for unlicensed frequency spectrum band operation) of the UE 115-*c*.

Figure 5:
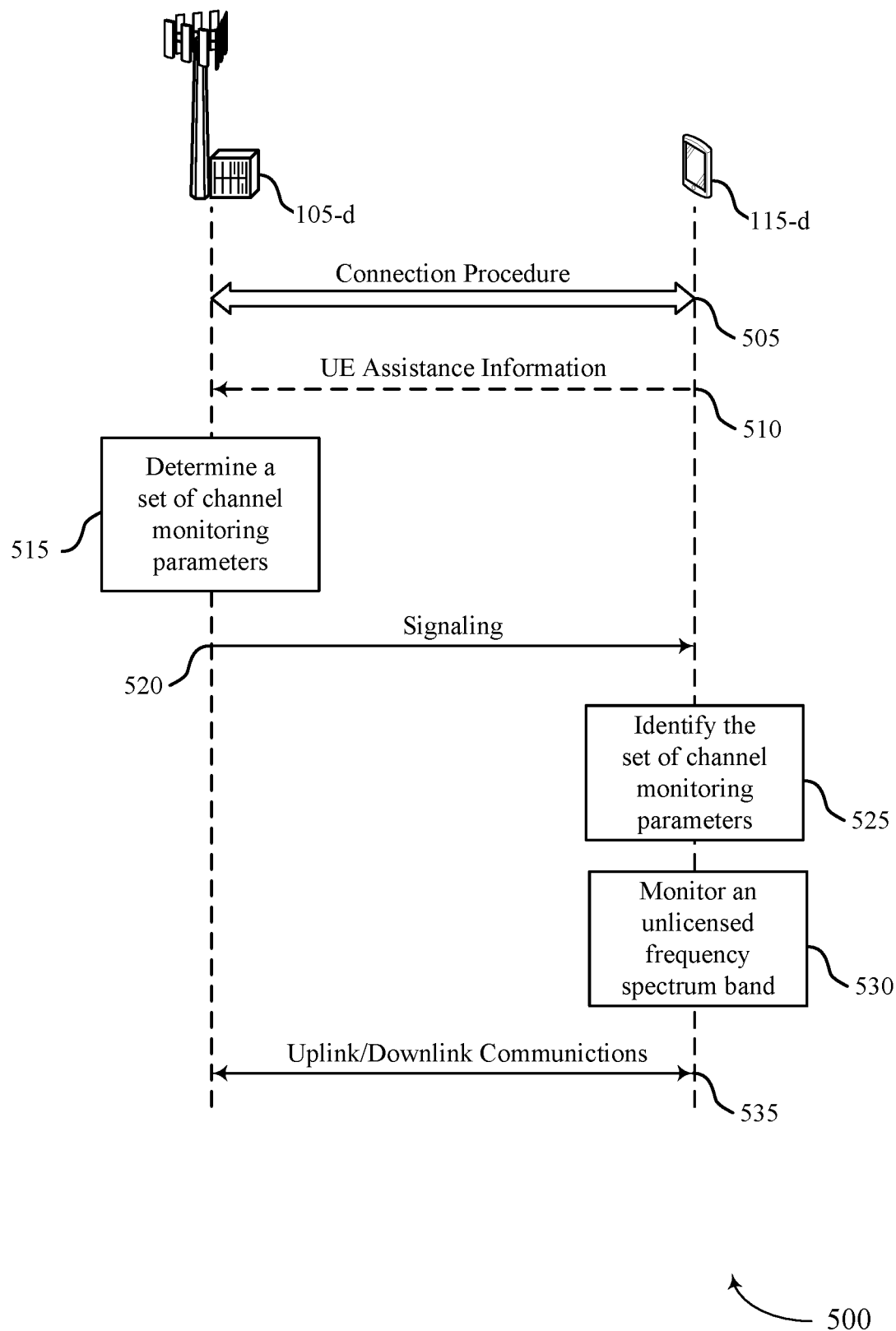
FIG. 5 illustrates an example of a process flow that supports adaptation of channel monitoring for unlicensed frequency spectrum band operation in accordance with aspects of the present disclosure.

FIG. 5 illustrates an example of a process flow 500 that supports adaptation of channel monitoring for unlicensed frequency spectrum band operation in accordance with aspects of the present disclosure. The process flow 500 may implement aspects of the wireless communications systems 100 and 200, such as providing improvements in channel monitoring for unlicensed frequency spectrum band operation. The process flow 500 may include a base station 105-*d* and a UE 115-*d*, which may be examples of the corresponding devices described with reference to FIGS. 1 through 4.

In the following description of the process flow 500, the operations between the base station 105-*d* and the UE 115-*d* may be transmitted in a different order than the exemplary order shown, or the operations performed by the base station 105-*d* and the UE 115-*d* may be performed in different orders or at different times. Certain operations may also be omitted from the process flow 500, and/or other operations may be added to the process flow 500.

At 505, the process flow 500 may commence with the base station 105-*d* and the UE 115-*d* performing a connection procedure (e.g., a radio resource control procedure, such as a cell acquisition procedure, random access procedure, a radio resource control connection procedure, a radio resource control (re-)configuration procedure) to establish a wired or wireless connection.

At 510, the UE 115-*d* may transmit UE assistance information to the base station 150-*d*. For example, UE 115-*d* may transmit UE assistance information in a control message (e.g., uplink control message) as part of the connection procedure. Alternatively, the UE 115-*d* may transmit UE assistance information in a control message during a transmission opportunity following the connection procedure. The UE assistance information may include a traffic load (e.g., data load) or a power level indicator (e.g., a battery level) of the UE 115-*d*, among other information.

At 515, the base station 105-*d* may determine a set of channel monitoring parameters. For example, the base station 105-*d* may determine a set of channel monitoring parameters related to monitoring an unlicensed frequency spectrum band, such as at least one of a length of a channel monitoring window, a periodicity of the channel monitoring window, a carrier or a bandwidth part of the channel monitoring window, or a combination thereof. In some examples, the base station 105-*d* may determine the set of channel monitoring parameters using the UE assistance information.

At 520, the base station 105-*d* may transmit signaling that identifies the set of channel monitoring parameters associated with monitoring the unlicensed frequency spectrum band to the UE 115-*d*. In some examples, the signaling may be via radio resource control signaling as part of the connection procedure. Alternatively, the signaling may be dynamic signaling including a downlink control information or a MAC CE, during a transmission opportunity following the connection procedure.

At 525, the UE 115-d may identify the set of channel monitoring parameters based on the signaling from the base station 105-d. At 530, the UE 115-d may monitor an unlicensed frequency spectrum band according to the set of channel monitoring parameters following the connection procedure or the transmission opportunity. In some examples, the UE 115-d may monitor the unlicensed frequency spectrum band according to at least one channel monitoring parameter of the set. The UE 115-d may in some examples, select at least one channel monitoring parameter of the set to use for monitoring the unlicensed frequency spectrum band based on the UE assistance information.

At 535, the process flow 500 may continue with the base station 105-d performing downlink communications to the UE 115-d or the UE 115-d performing uplink communications to the base station 105-d. The downlink and uplink communications may occur during a subsequent transmission opportunity. For example, the UE 115-d may identify a subsequent transmission opportunity based on monitoring the unlicensed frequency spectrum band. In some examples, the UE 115-d may, following a termination of the subsequent transmission opportunity in the unlicensed frequency spectrum band, continue to monitor the unlicensed frequency spectrum band. The UE 115-d may continue monitoring the unlicensed frequency spectrum band using the set of channel monitoring parameters or an updated set of channel monitoring parameters that may be communicated by the base station 105-d during the subsequent transmission opportunity, or the UE 115-d may select a subset of the set of channel monitoring parameters (e.g., UE's autonomous selection).

Therefore, the present disclosure may provide improvements in channel monitoring for unlicensed frequency spectrum band operation. Furthermore, the techniques described herein may provide benefits and enhancements to the operation of the UE 115-d. For example, by providing a set of channel monitoring parameters, the operational characteristics, such as power consumption, processor utilization, and memory usage related to channel monitoring for unlicensed frequency spectrum band operation may be reduced. The techniques described herein may also provide efficiency to the UE 115-d by reducing latency associated with processes related to wireless communications, and more specifically to channel monitoring for unlicensed frequency spectrum band operation.

Figure 6:
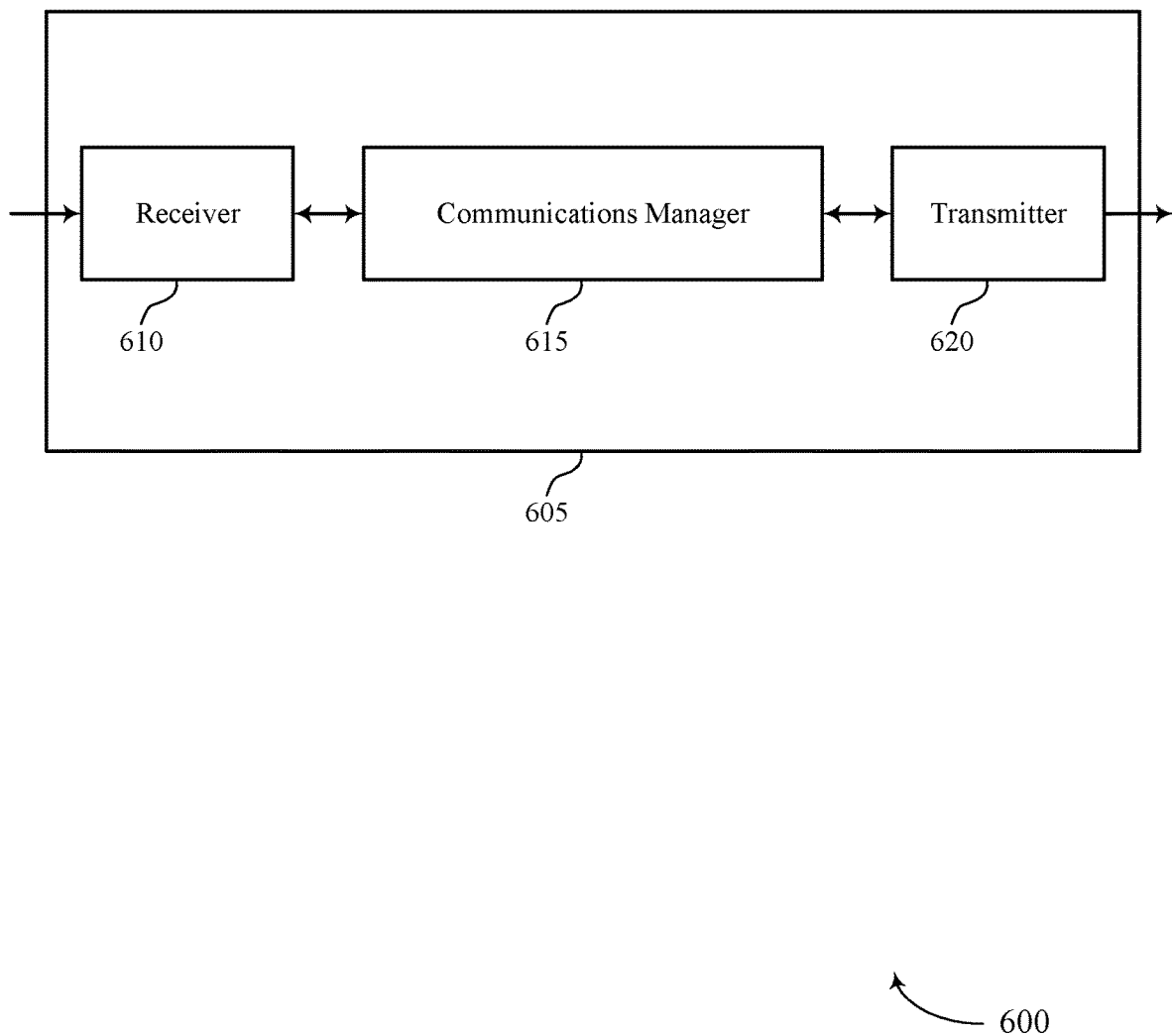
FIGS. 6 and 7 show block diagrams of devices that support adaptation of channel monitoring for unlicensed frequency spectrum band operation in accordance with aspects of the present disclosure.

FIG. 6 shows a block diagram 600 of a device 605 that supports adaptation of channel monitoring for unlicensed frequency spectrum band operation in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to adaptation of channel monitoring for unlicensed frequency spectrum band operation, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive signaling from a base station that identifies a set of channel monitoring parameters associated with monitoring an unlicensed frequency spectrum band, the set of channel monitoring parameters including at least one of a length of a channel monitoring window, a periodicity of the channel monitoring window, a carrier or a bandwidth part of the channel monitoring window, or a combination thereof, identify a termination of a transmission opportunity in the unlicensed frequency spectrum band, and monitor the unlicensed frequency spectrum band following the termination of the transmission opportunity using the set of channel monitoring parameters. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a field programmable gate array (FPGA) or other programmable logic device (PLD), discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
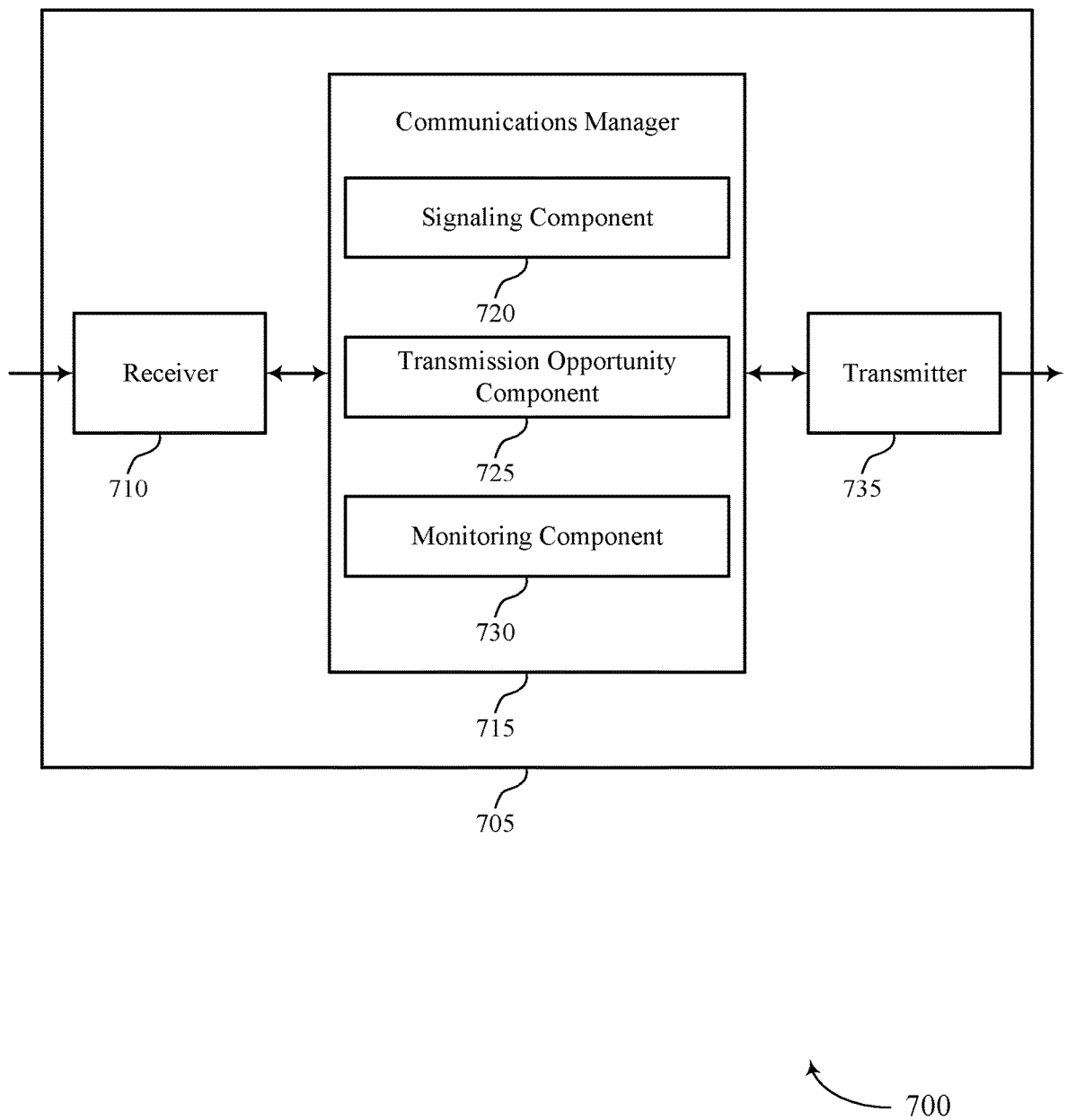

FIG. 7 shows a block diagram 700 of a device 705 that supports adaptation of channel monitoring for unlicensed frequency spectrum band operation in accordance with aspects of the present disclosure. The device 705 may be an example of aspects of a device 605 or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to adaptation of channel monitoring for unlicensed frequency spectrum band operation, etc.).

Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a signaling component 720, a transmission opportunity component 725, and a monitoring component 730. The communications manager 715 may be an example of aspects of the communications manager 910 described herein.

The signaling component 720 may receive signaling from a base station that identifies a set of channel monitoring parameters associated with monitoring an unlicensed frequency spectrum band, the set of channel monitoring parameters including at least one of a length of a channel monitoring window, a periodicity of the channel monitoring window, a carrier or a bandwidth part of the channel monitoring window, or a combination thereof. The transmission opportunity component 725 may identify a termination of a transmission opportunity in the unlicensed frequency spectrum band. The monitoring component 730 may monitor the unlicensed frequency spectrum band following the termination of the transmission opportunity using the set of channel monitoring parameters.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
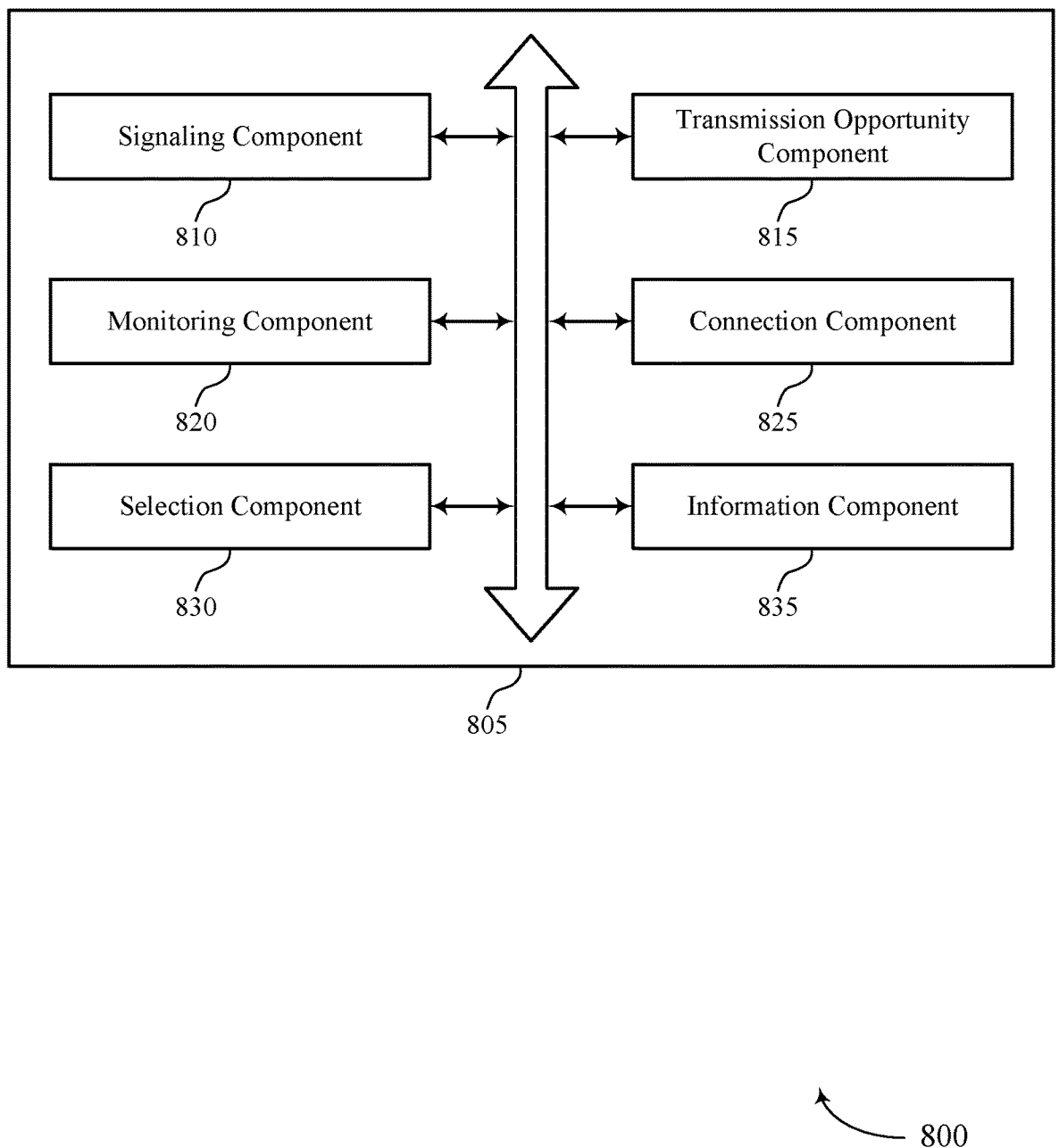
FIG. 8 shows a block diagram of a communications manager that supports adaptation of channel monitoring for unlicensed frequency spectrum band operation in accordance with aspects of the present disclosure.

FIG. 8 shows a block diagram 800 of a communications manager 805 that supports adaptation of channel monitoring for unlicensed frequency spectrum band operation in accordance with aspects of the present disclosure. The communications manager 805 may be an example of aspects of a communications manager 615, a communications manager 715, or a communications manager 910 described herein. The communications manager 805 may include a signaling component 810, a transmission opportunity component 815, a monitoring component 820, a connection component 825, a selection component 830, and an information component 835. Each of these modules may communicate, directly or indirectly, with one another (e.g., via one or more buses).

The signaling component 810 may receive signaling from a base station that identifies a set of channel monitoring parameters associated with monitoring an unlicensed frequency spectrum band, the set of channel monitoring parameters including at least one of a length of a channel monitoring window, a periodicity of the channel monitoring window, a carrier or a bandwidth part of the channel monitoring window, or a combination thereof. In some examples, the signaling component 810 may receive the signaling via radio resource control (RRC) signaling based on a connection procedure, where the set of channel monitoring parameters are UE-specific. In some examples, the signaling component 810 may receive signaling that identifies a second set of channel monitoring parameters via dynamic signaling during the transmission opportunity. The signaling may be received dynamically during the transmission opportunity. In some examples, the dynamic signaling includes a downlink control information or a MAC CE. The signaling may include an index mapping to a lookup entry in a set of lookup entries, where the set of lookup entries includes the set of channel monitoring parameters. In some examples, the signaling may include RRC signaling received during the transmission opportunity. In some examples, the set of channel monitoring parameters is based on a group UE-common configuration or a UE-specific configuration. The set of channel monitoring windows may include at least one of a set of PDCCH monitoring occasions, a set of initial signal monitoring occasions, a set of reference signal monitoring occasions, a set of beacon signal monitoring occasions, or a set of wakeup signal monitoring occasions.

The transmission opportunity component 815 may identify a termination of a transmission opportunity in the unlicensed frequency spectrum band.

The monitoring component 820 may monitor the unlicensed frequency spectrum band following the termination of the transmission opportunity using the set of channel monitoring parameters. In some examples, the monitoring component 820 may monitor the unlicensed frequency spectrum band based on at least one channel monitoring parameter of the second set of channel monitoring parameters. In some examples, the monitoring component 820 monitors a control channel using the set of channel monitoring parameters.

The connection component 825 may perform a connection procedure between the UE and the base station.

The selection component 830 may select at least one channel monitoring parameter of the set of channel monitoring parameters based on UE assistance information, where monitoring the unlicensed frequency spectrum band is further based on the selected channel monitoring parameter.

The information component 835 may determine UE assistance information. In some examples, the information component 835 may transmit the UE assistance information to the base station, where receiving the signaling that identifies the set of channel monitoring parameters is further based on the UE assistance information. In some examples, the information component 835 may identify a traffic load related to the wireless communications with the base station. In some examples, the information component 835 may indicate the traffic load related to the wireless communications with the base station in the UE assistance information, where receiving the signaling that identifies the set of channel monitoring parameters is based on the traffic load. In some examples, the information component 835 may identify a power status of the UE. In some examples, the information component 835 may indicate the power status of the UE in the UE assistance information, where receiving the signaling that identifies the set of channel monitoring parameters is based on the power status of the UE.

Figure 9:
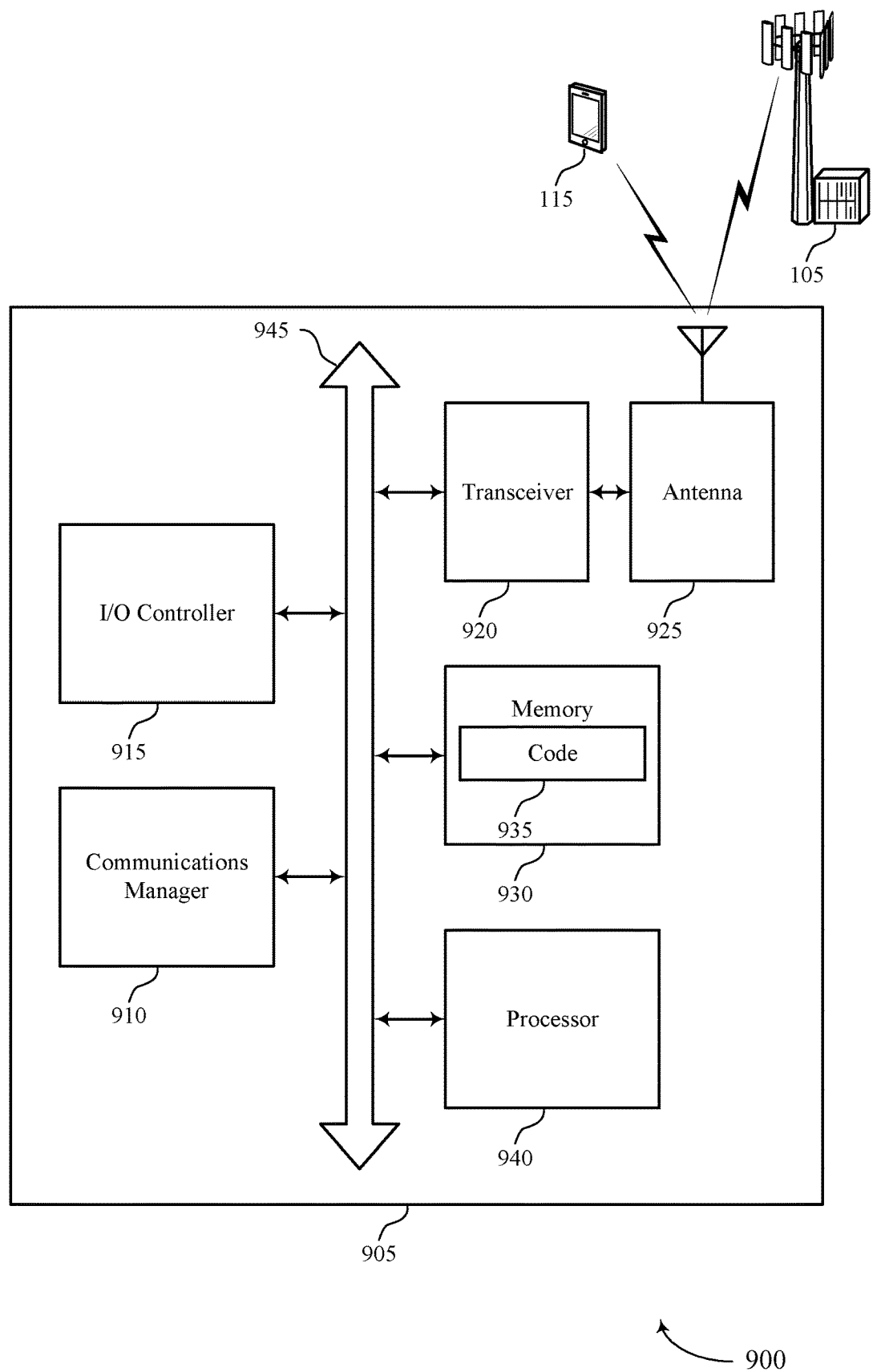
FIG. 9 shows a diagram of a system including a device that supports adaptation of channel monitoring for unlicensed frequency spectrum band operation in accordance with aspects of the present disclosure.

FIG. 9 shows a diagram of a system 900 including a device 905 that supports adaptation of channel monitoring for unlicensed frequency spectrum band operation in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive signaling from a base station that identifies a set of channel monitoring parameters associated with monitoring an unlicensed frequency spectrum band, the set of channel monitoring parameters including at least one of a length of a channel monitoring window, a periodicity of the channel monitoring window, a carrier or a bandwidth part of the channel monitoring window, or a combination thereof, identify a termination of a transmission opportunity in the unlicensed frequency spectrum band, and monitor the unlicensed frequency spectrum band following the termination of the transmission opportunity using the set of channel monitoring parameters.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas. In some examples, the device 905 may include a single antenna 925. However, in some examples the device 905 may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting adaptation of channel monitoring for unlicensed frequency spectrum band operation).

Figure 10:
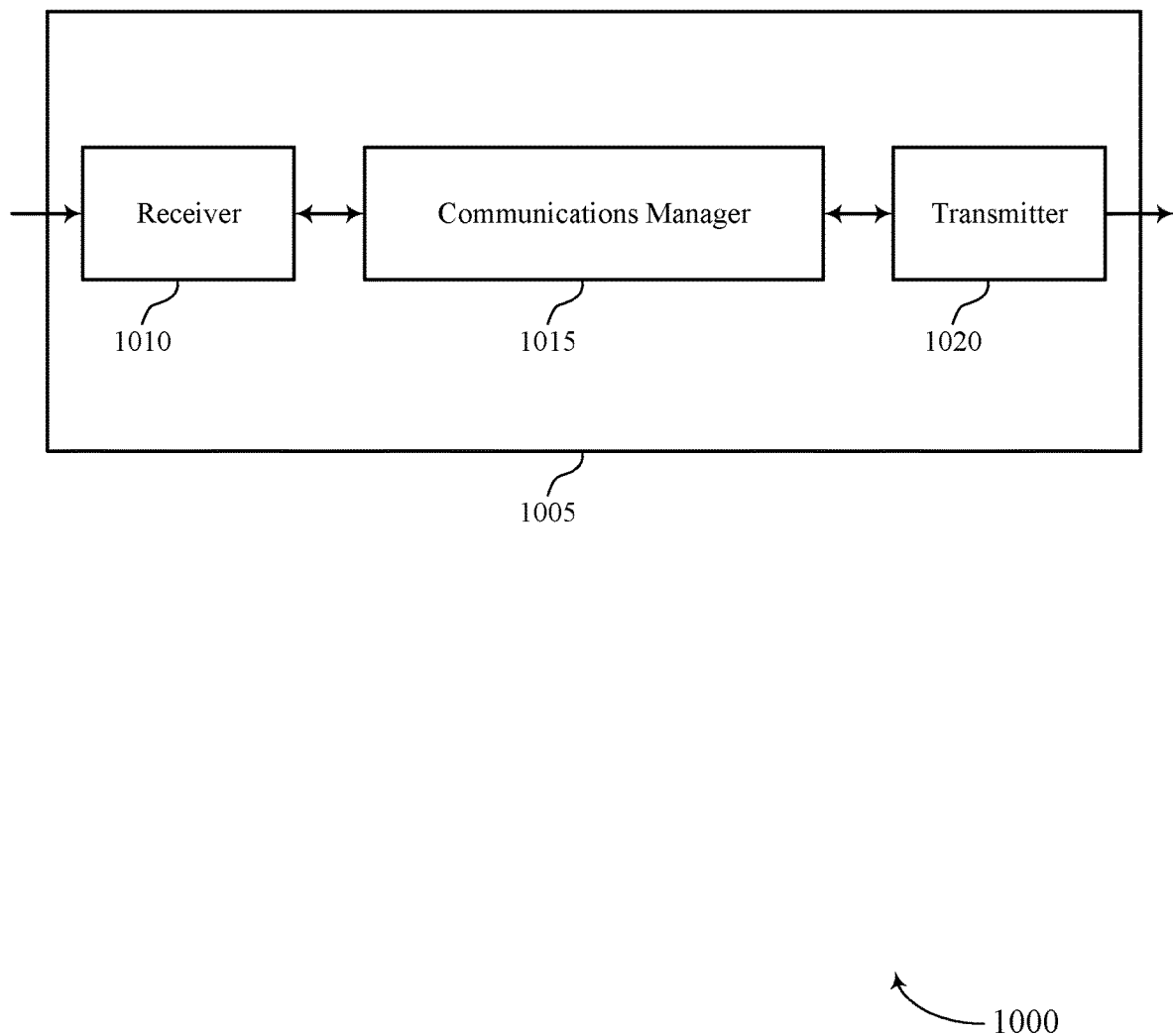
FIGS. 10 and 11 show block diagrams of devices that support adaptation of channel monitoring for unlicensed frequency spectrum band operation in accordance with aspects of the present disclosure.

FIG. 10 shows a block diagram 1000 of a device 1005 that supports adaptation of channel monitoring for unlicensed frequency spectrum band operation in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to adaptation of channel monitoring for unlicensed frequency spectrum band operation, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may determine a set of channel monitoring parameters associated with monitoring an unlicensed frequency spectrum band, the set of channel monitoring parameters including at least one of a length of a channel monitoring window, a periodicity of the channel monitoring window, a carrier or a bandwidth part of the channel monitoring window, or a combination thereof and transmit signaling, to a UE in wireless communications with the device 1005 during a transmission opportunity, that identifies the set of channel monitoring parameters associated with monitoring the unlicensed frequency spectrum band. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
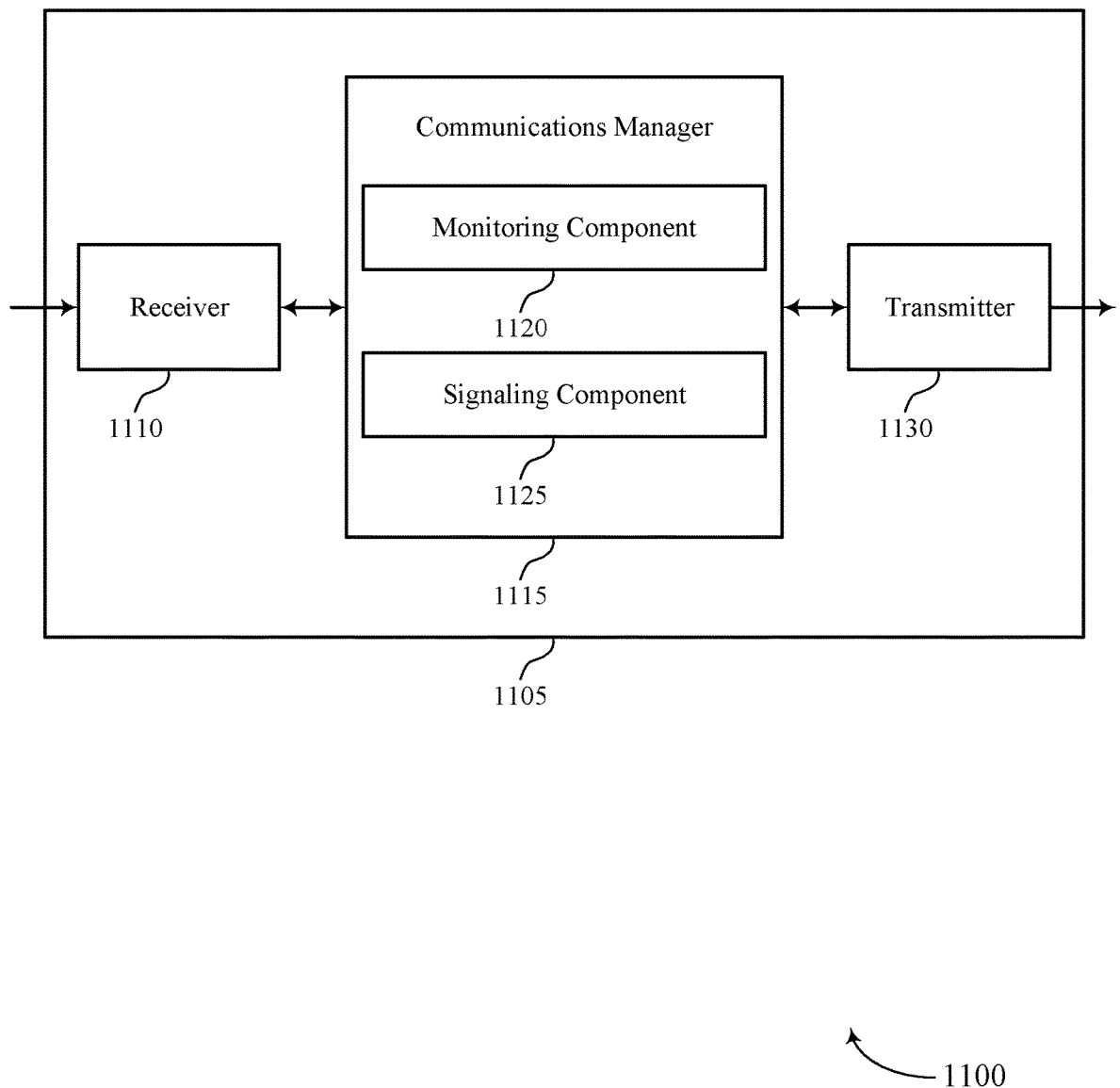

FIG. 11 shows a block diagram 1100 of a device 1105 that supports adaptation of channel monitoring for unlicensed frequency spectrum band operation in accordance with aspects of the present disclosure. The device 1105 may be an example of aspects of a device 1005, or a base station 105 as described herein. The device 1105 may include a receiver 1110, a communications manager 1115, and a transmitter 1130. The device 1105 may also include a processor. Each of these components may be in communication with one another (e.g., via one or more buses).

The receiver 1110 may receive information such as packets, user data, or control information associated with various information channels (e.g., control channels, data channels, and information related to adaptation of channel monitoring for unlicensed frequency spectrum band operation, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a monitoring component 1120 and a signaling component 1125. The communications manager 1115 may be an example of aspects of the communications manager 1310 described herein.

The monitoring component 1120 may determine a set of channel monitoring parameters associated with monitoring an unlicensed frequency spectrum band, the set of channel monitoring parameters including at least one of a length of a channel monitoring window, a periodicity of the channel monitoring window, a carrier or a bandwidth part of the channel monitoring window, or a combination thereof.

The signaling component 1125 may transmit signaling, to a UE in wireless communications with the device 1105 during a transmission opportunity, that identifies the set of channel monitoring parameters associated with monitoring the unlicensed frequency spectrum band.

The transmitter 1130 may transmit signals generated by other components of the device 1105. In some examples, the transmitter 1130 may be collocated with a receiver 1110 in a transceiver module. For example, the transmitter 1130 may be an example of aspects of the transceiver 1320 described with reference to FIG. 13. The transmitter 1130 may utilize a single antenna or a set of antennas.

Figure 12:
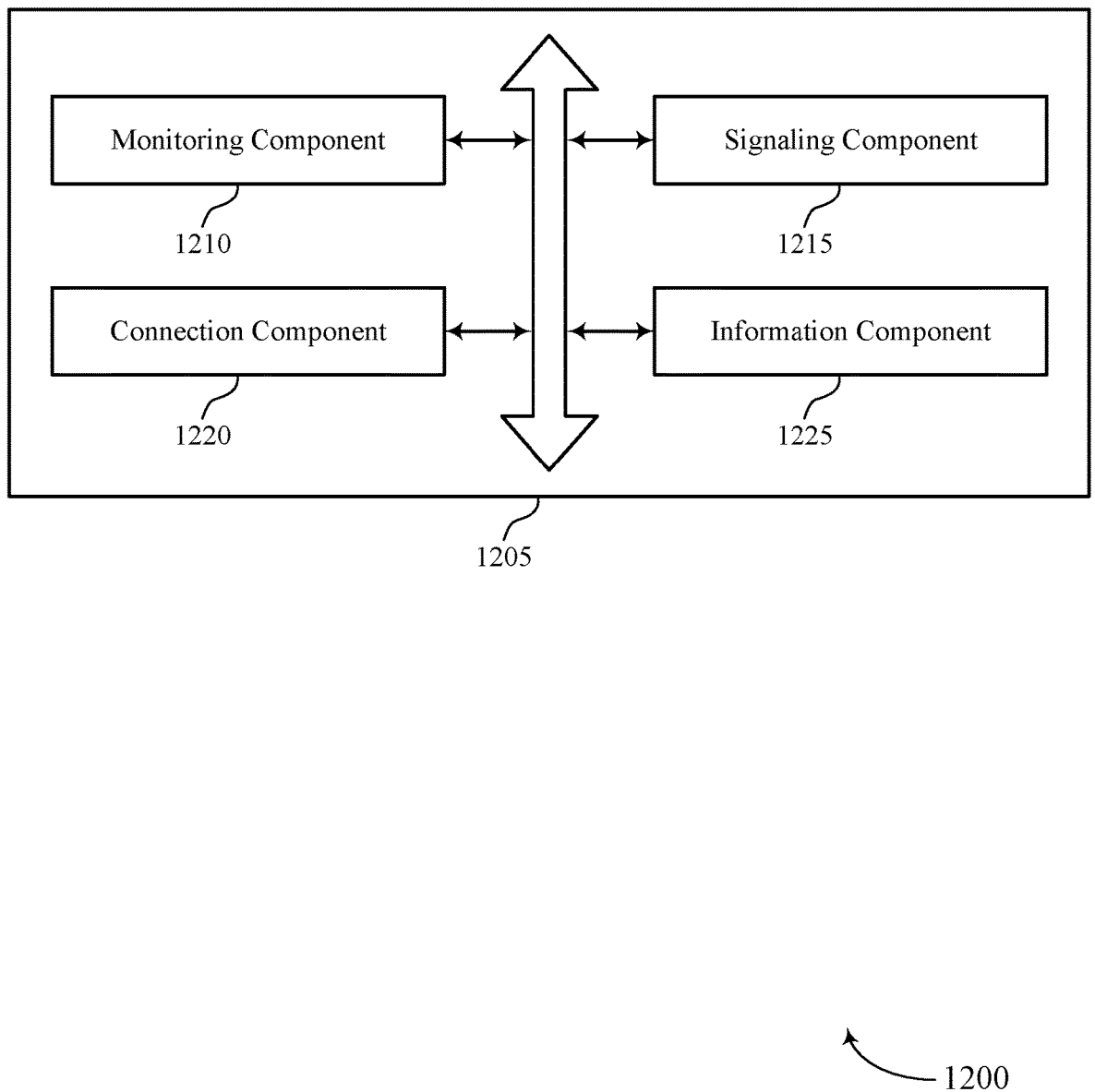
FIG. 12 shows a block diagram of a communications manager that supports adaptation of channel monitoring for unlicensed frequency spectrum band operation in accordance with aspects of the present disclosure.

FIG. 12 shows a block diagram 1200 of a communications manager 1205 that supports adaptation of channel monitoring for unlicensed frequency spectrum band operation in accordance with aspects of the present disclosure. The communications manager 1205 may be an example of aspects of a communications manager 1015, a communications manager 1115, or a communications manager 1310 described herein. The communications manager 1205 may include a monitoring component 1210, a signaling component 1215, a connection component 1220, and an information component 1225. Each of these modules may communicate, directly or indirectly, with one another (e.g., via one or more buses).

The monitoring component 1210 may determine a set of channel monitoring parameters associated with monitoring an unlicensed frequency spectrum band, the set of channel monitoring parameters including at least one of a length of a channel monitoring window, a periodicity of the channel monitoring window, a carrier or a bandwidth part of the channel monitoring window, or a combination thereof. In some examples, the monitoring component 1210 may determine a second set of channel monitoring parameters associated with monitoring the unlicensed frequency spectrum band. In some examples, the set of channel monitoring parameters may be based on a group UE-common configuration or a UE-specific configuration.

The signaling component 1215 may transmit signaling, to a UE in wireless communications with the communications manager 1205 during a transmission opportunity, that identifies the set of channel monitoring parameters associated with monitoring the unlicensed frequency spectrum band. In some examples, the signaling component 1215 may transmit the signaling via RRC signaling based on a connection procedure, where the set of channel monitoring parameters are UE-specific. In some examples, the signaling component 1215 may transmit a second signaling that identifies the second set of channel monitoring parameters via dynamic signaling during the transmission opportunity. In some examples, the signaling is transmitted dynamically during the transmission opportunity. In some examples, the dynamic signaling includes a downlink control information or a MAC CE. In some examples, the signaling includes an index mapping to a lookup entry in a set of lookup entries, where the set of lookup entries includes the set of channel monitoring parameters. The set of channel monitoring windows may include at least one of a set of PDCCH monitoring occasions, a set of initial signal monitoring occasions, a set of reference signal monitoring occasions, a set of beacon signal monitoring occasions, or a set of wakeup signal monitoring occasions.

The connection component 1220 may perform a connection procedure between the base station and the UE. The information component 1225 may receive UE assistance information, where determining the set of channel monitoring parameters associated with monitoring the unlicensed frequency spectrum band is further based on the UE assistance information. In some examples, the information component 1225 may identify a traffic load related to the wireless communications with the UE based on the UE assistance information, where determining the set of channel monitoring parameters associated with monitoring the unlicensed frequency spectrum band is further based on the traffic load. In some examples, the information component 1225 may identify a power status of the UE based on the UE assistance information, where determining the set of channel monitoring parameters associated with monitoring the unlicensed frequency spectrum band is further based on the power status of the UE.

Figure 13:
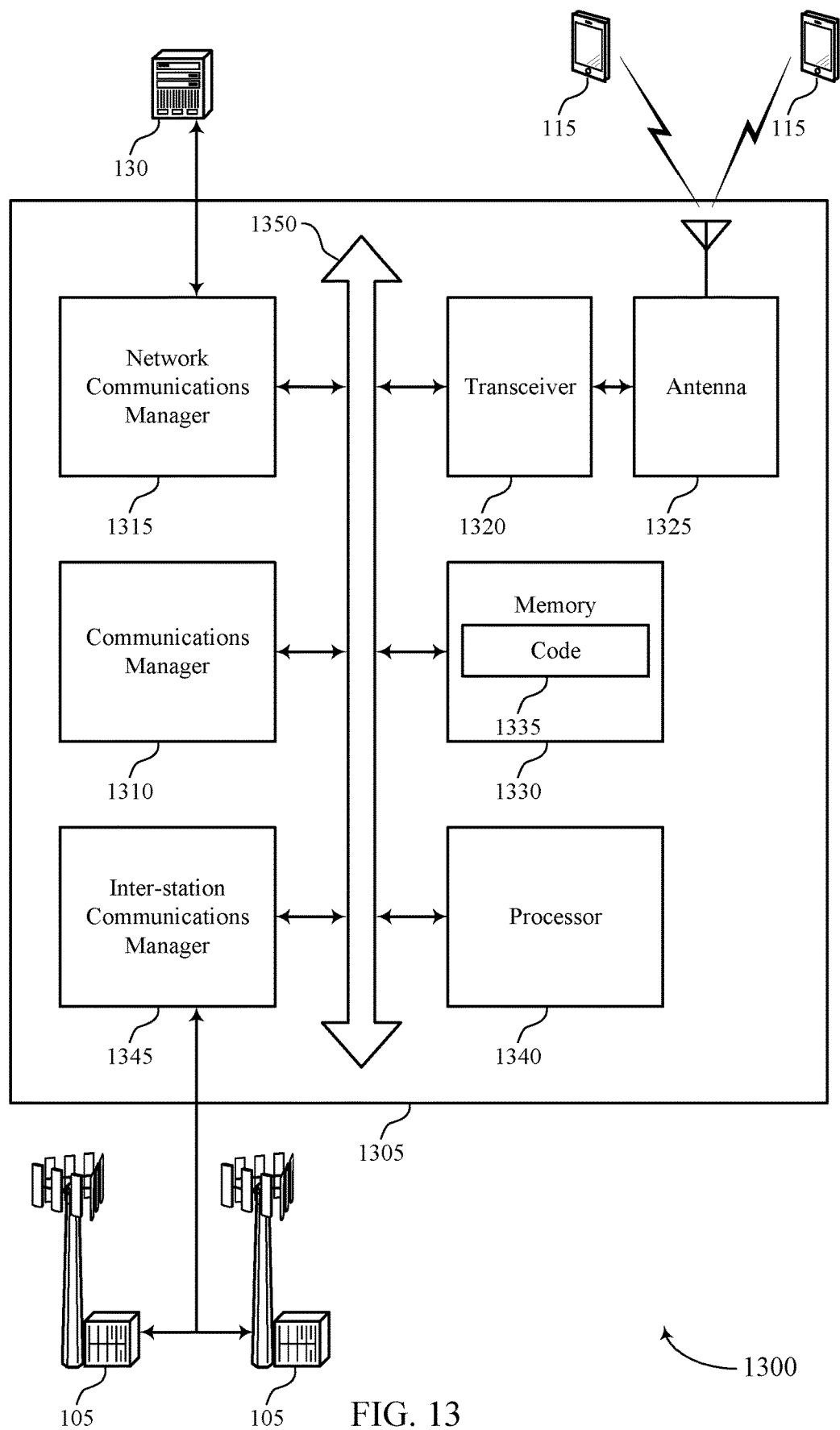
FIG. 13 shows a diagram of a system including a device that supports adaptation of channel monitoring for unlicensed frequency spectrum band operation in accordance with aspects of the present disclosure.

FIG. 13 shows a diagram of a system 1300 including a device 1305 that supports adaptation of channel monitoring for unlicensed frequency spectrum band operation in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may determine a set of channel monitoring parameters associated with monitoring an unlicensed frequency spectrum band, the set of channel monitoring parameters including at least one of a length of a channel monitoring window, a periodicity of the channel monitoring window, a carrier or a bandwidth part of the channel monitoring window, or a combination thereof and transmit signaling, to a UE in wireless communications with the device 1305 during a transmission opportunity, that identifies the set of channel monitoring parameters associated with monitoring the unlicensed frequency spectrum band.

The network communications manager 1315 may manage communications with a core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas. In some cases, the device 1305 may include a single antenna 1325. However, in some cases the device 1305 may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device 1305 to perform various functions described herein. In some cases, the memory 1330 may contain, among other things, a BIOS which may control basic hardware or software operation such as the interaction with peripheral components or devices.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting adaptation of channel monitoring for unlicensed frequency spectrum band operation).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

Figure 14:
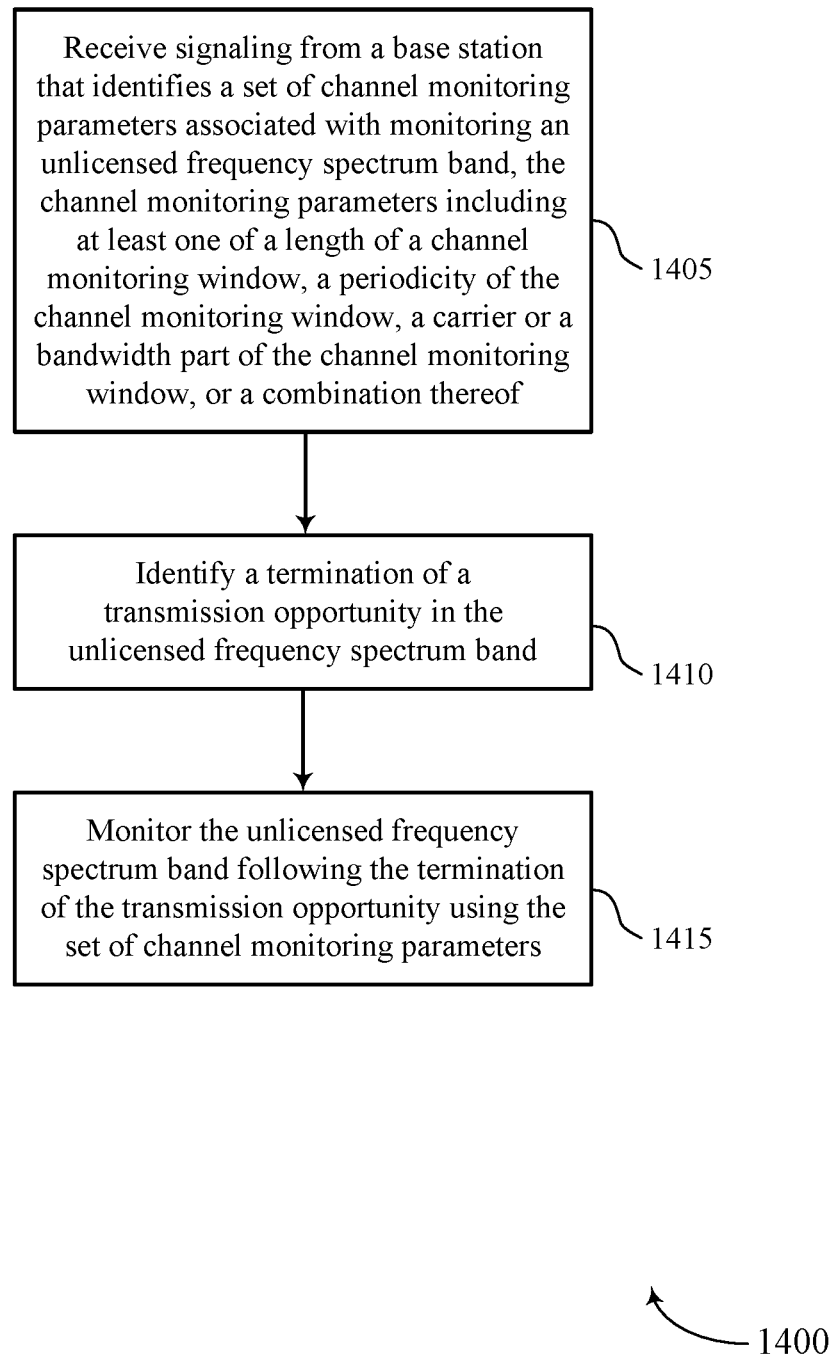
FIGS. 14 through 19 show flowcharts illustrating methods that support adaptation of channel monitoring for unlicensed frequency spectrum band operation in accordance with aspects of the present disclosure.

FIG. 14 shows a flowchart illustrating a method 1400 that supports adaptation of channel monitoring for unlicensed frequency spectrum band operation in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive signaling from a base station that identifies a set of channel monitoring parameters associated with monitoring an unlicensed frequency spectrum band, the set of channel monitoring parameters including at least one of a length of a channel monitoring window, a periodicity of the channel monitoring window, a carrier or a bandwidth part of the channel monitoring window, or a combination thereof. The operations of 1405 may be performed according to the methods described herein. In some examples, aspects of the operations of 1405 may be performed by a signaling component as described with reference to FIGS. 6 through 9.

At 1410, the UE may identify a termination of a transmission opportunity in the unlicensed frequency spectrum band. The operations of 1410 may be performed according to the methods described herein. In some examples, aspects of the operations of 1410 may be performed by a transmission opportunity component as described with reference to FIGS. 6 through 9.

At 1415, the UE may monitor the unlicensed frequency spectrum band following the termination of the transmission opportunity using the set of channel monitoring parameters. The UE may monitor a control channel of the unlicensed frequency spectrum band. The control channel may be a PUCCH or a PDCCH, for example. The control channel may include a control message (e.g., radio resource control message, downlink control information, MAC CE, etc.) with the based on the type of signaling (e.g., dynamic or non-dynamic). The operations of 1415 may be performed according to the methods described herein. In some examples, aspects of the operations of 1415 may be performed by a monitoring component as described with reference to FIGS. 6 through 9.

Figure 15:
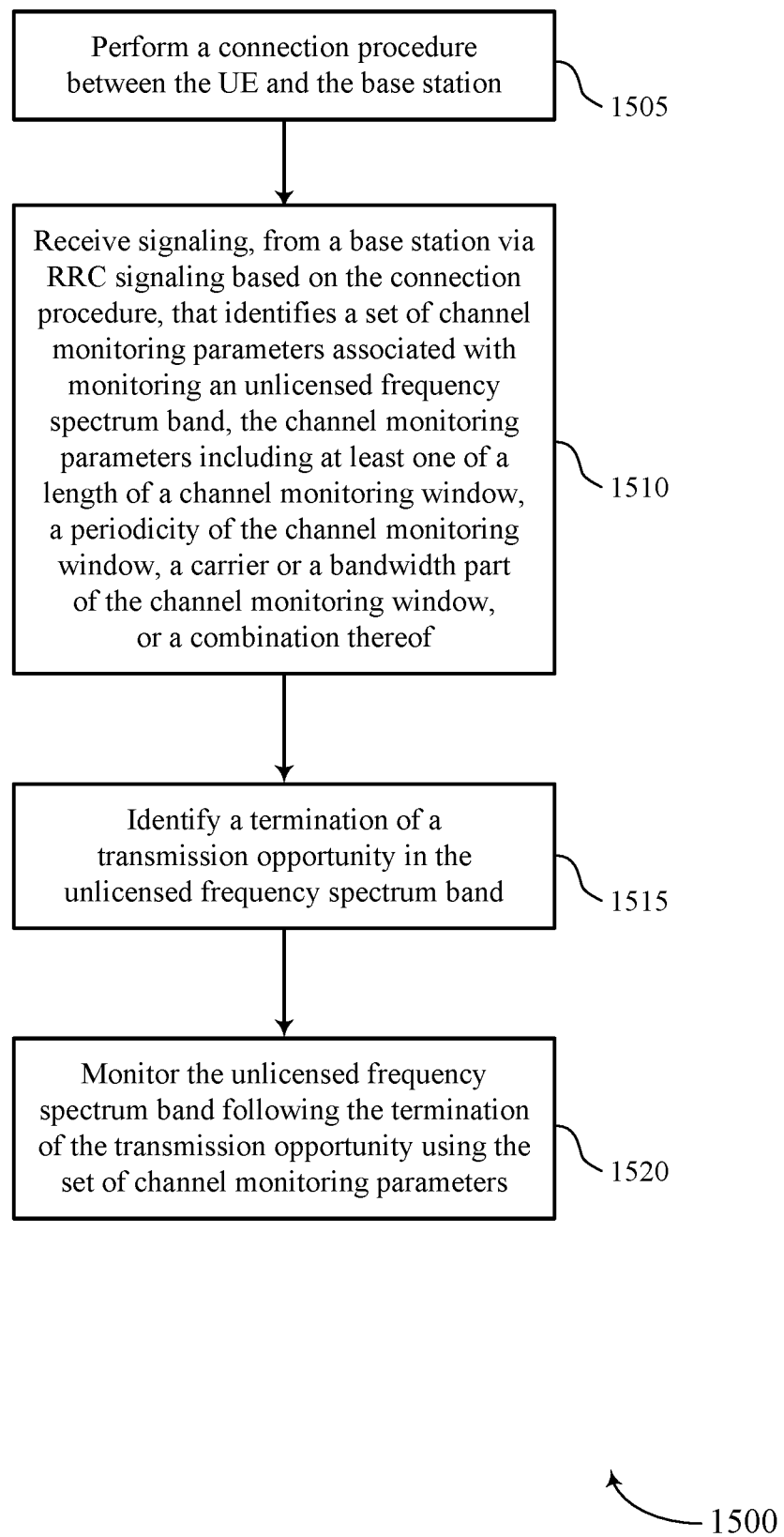

FIG. 15 shows a flowchart illustrating a method 1500 that supports adaptation of channel monitoring for unlicensed frequency spectrum band operation in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may perform a connection procedure between the UE and a base station. The operations of 1505 may be performed according to the methods described herein. In some examples, aspects of the operations of 1505 may be performed by a connection component as described with reference to FIGS. 6 through 9.

At 1510, the UE may receive signaling, from a base station via RRC signaling based on the connection procedure, that identifies a set of channel monitoring parameters associated with monitoring an unlicensed frequency spectrum band, the set of channel monitoring parameters including at least one of a length of a channel monitoring window, a periodicity of the channel monitoring window, a carrier or a bandwidth part of the channel monitoring window, or a combination thereof. The operations of 1510 may be performed according to the methods described herein. In some examples, aspects of the operations of 1510 may be performed by a signaling component as described with reference to FIGS. 6 through 9.

At 1515, the UE may identify a termination of a transmission opportunity in the unlicensed frequency spectrum band. The operations of 1515 may be performed according to the methods described herein. In some examples, aspects of the operations of 1515 may be performed by a transmission opportunity component as described with reference to FIGS. 6 through 9.

At 1520, the UE may monitor the unlicensed frequency spectrum band following the termination of the transmission opportunity using the set of channel monitoring parameters. The operations of 1520 may be performed according to the methods described herein. In some examples, aspects of the operations of 1520 may be performed by a monitoring component as described with reference to FIGS. 6 through 9.

Figure 16:
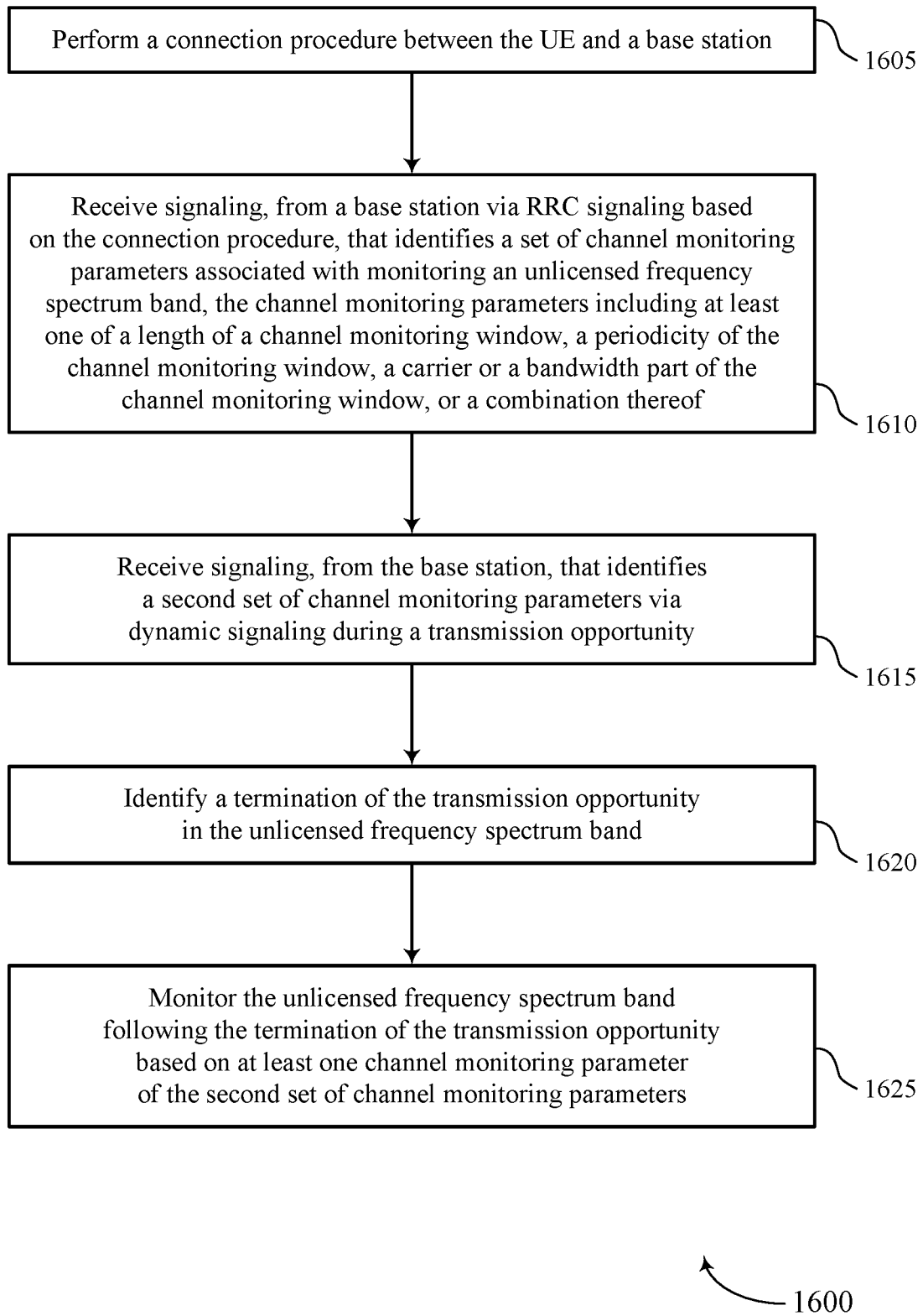

FIG. 16 shows a flowchart illustrating a method 1600 that supports adaptation of channel monitoring for unlicensed frequency spectrum band operation in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may perform a connection procedure between the UE and a base station. The operations of 1605 may be performed according to the methods described herein. In some examples, aspects of the operations of 1605 may be performed by a connection component as described with reference to FIGS. 6 through 9.

At 1610, the UE may receive signaling, from the base station via RRC signaling based on the connection procedure, that identifies a set of channel monitoring parameters associated with monitoring an unlicensed frequency spectrum band, the set of channel monitoring parameters including at least one of a length of a channel monitoring window, a periodicity of the channel monitoring window, a carrier or a bandwidth part of the channel monitoring window, or a combination thereof. The operations of 1610 may be performed according to the methods described herein. In some examples, aspects of the operations of 1610 may be performed by a signaling component as described with reference to FIGS. 6 through 9.

At 1615, the UE may receive signaling, from the base station, that identifies a second set of channel monitoring parameters via dynamic signaling during a transmission opportunity. The operations of 1615 may be performed according to the methods described herein. In some examples, aspects of the operations of 1615 may be performed by a signaling component as described with reference to FIGS. 6 through 9.

At 1620, the UE may identify a termination of the transmission opportunity in the unlicensed frequency spectrum band. The operations of 1620 may be performed according to the methods described herein. In some examples, aspects of the operations of 1620 may be performed by a transmission opportunity component as described with reference to FIGS. 6 through 9.

At 1625, the UE may monitor the unlicensed frequency spectrum band following the termination of the transmission opportunity based on at least one channel monitoring parameter of the second set of channel monitoring parameters. The operations of 1625 may be performed according to the methods described herein. In some examples, aspects of the operations of 1625 may be performed by a monitoring component as described with reference to FIGS. 6 through 9.

Figure 17:
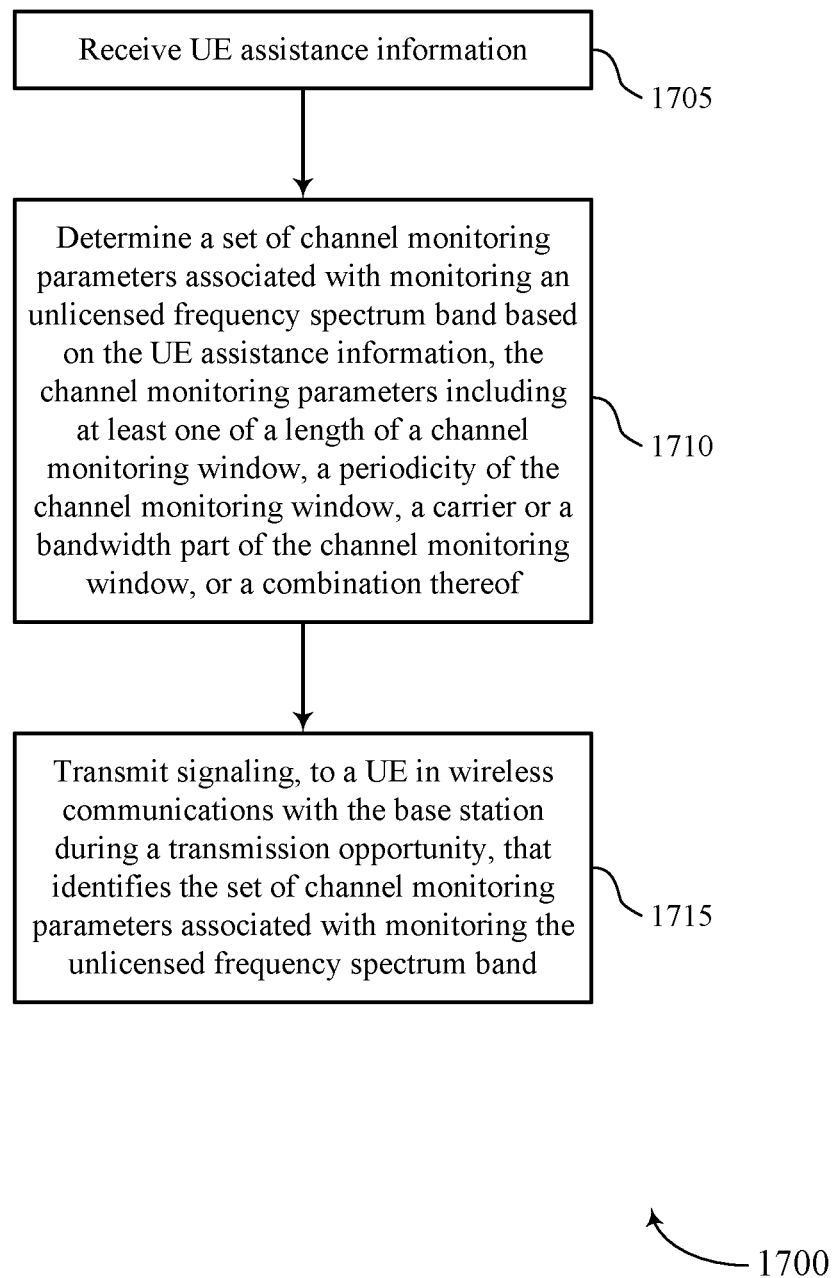

FIG. 17 shows a flowchart illustrating a method 1700 that supports adaptation of channel monitoring for unlicensed frequency spectrum band operation in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may receive UE assistance information. In some examples, the UE assistance information may include traffic load related to wireless communications with the base station, or a power status of a UE in wireless communications with the base station, among others. The operations of 1705 may be performed according to the methods described herein. In some examples, aspects of the operations of 1705 may be performed by an information component as described with reference to FIGS. 10 through 13.

At 1710, the base station may determine a set of channel monitoring parameters associated with monitoring an unlicensed frequency spectrum band based on the UE assistance information, the set of channel monitoring parameters including at least one of a length of a channel monitoring window, a periodicity of the channel monitoring window, a carrier or a bandwidth part of the channel monitoring window, or a combination thereof. The operations of 1710 may be performed according to the methods described herein. In some examples, aspects of the operations of 1710 may be performed by a monitoring component as described with reference to FIGS. 10 through 13.

At 1715, the base station may transmit signaling, to a UE in wireless communications with the base station during a transmission opportunity, that identifies the set of channel monitoring parameters associated with monitoring the unlicensed frequency spectrum band. The operations of 1715 may be performed according to the methods described herein. In some examples, aspects of the operations of 1715 may be performed by a signaling component as described with reference to FIGS. 10 through 13.

Figure 18:
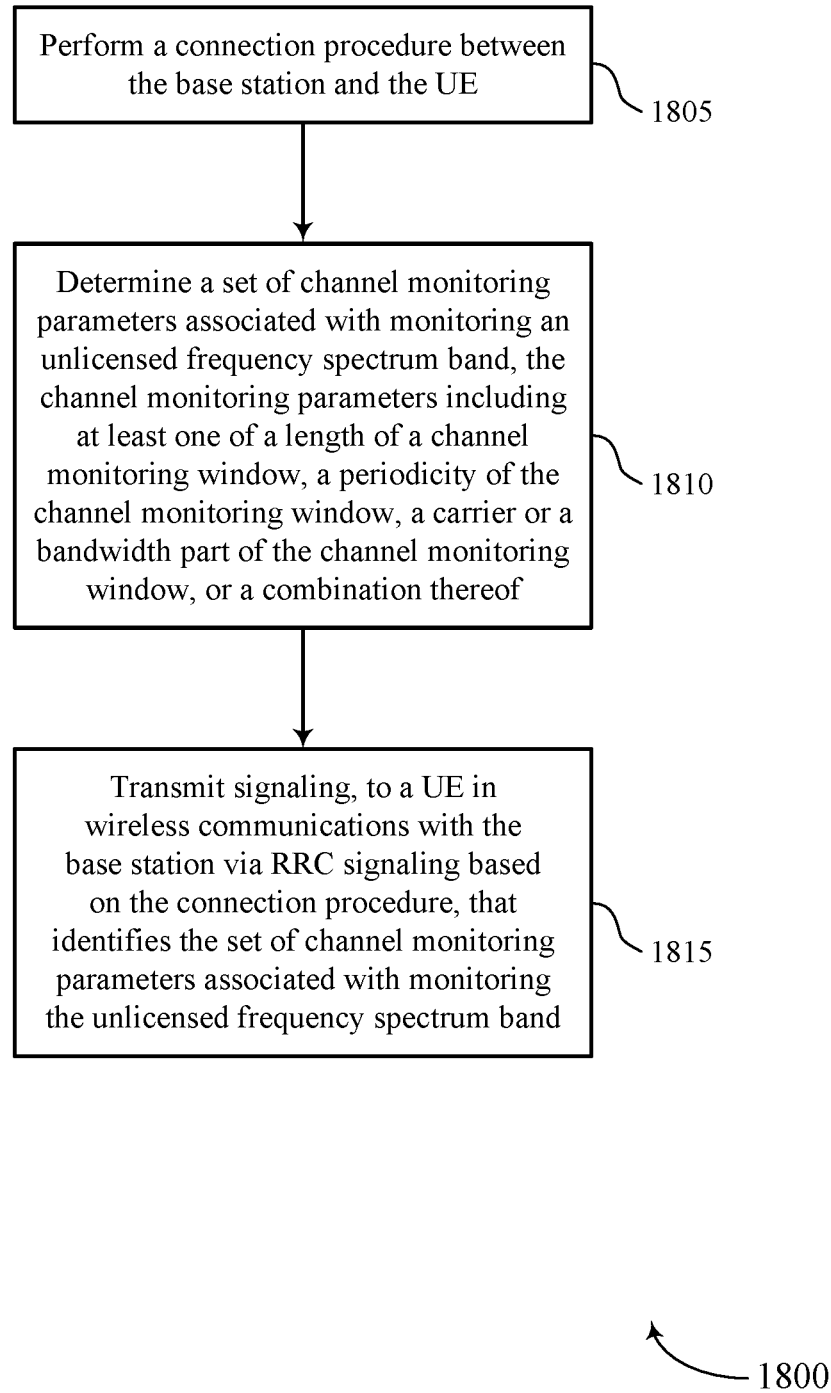

FIG. 18 shows a flowchart illustrating a method 1800 that supports adaptation of channel monitoring for unlicensed frequency spectrum band operation in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may perform a connection procedure between the base station and the UE. The operations of 1805 may be performed according to the methods described herein. In some examples, aspects of the operations of 1805 may be performed by a connection component as described with reference to FIGS. 10 through 13.

At 1810, the base station may determine a set of channel monitoring parameters associated with monitoring an unlicensed frequency spectrum band, the set of channel monitoring parameters including at least one of a length of a channel monitoring window, a periodicity of the channel monitoring window, a carrier or a bandwidth part of the channel monitoring window, or a combination thereof. The operations of 1810 may be performed according to the methods described herein. In some examples, aspects of the operations of 1810 may be performed by a monitoring component as described with reference to FIGS. 10 through 13.

At 1815, the base station may transmit signaling, to a UE in wireless communications with the base station via RRC signaling based on the connection procedure, that identifies the set of channel monitoring parameters associated with monitoring the unlicensed frequency spectrum band. The operations of 1815 may be performed according to the methods described herein. In some examples, aspects of the operations of 1815 may be performed by a signaling component as described with reference to FIGS. 10 through 13.

Figure 19:
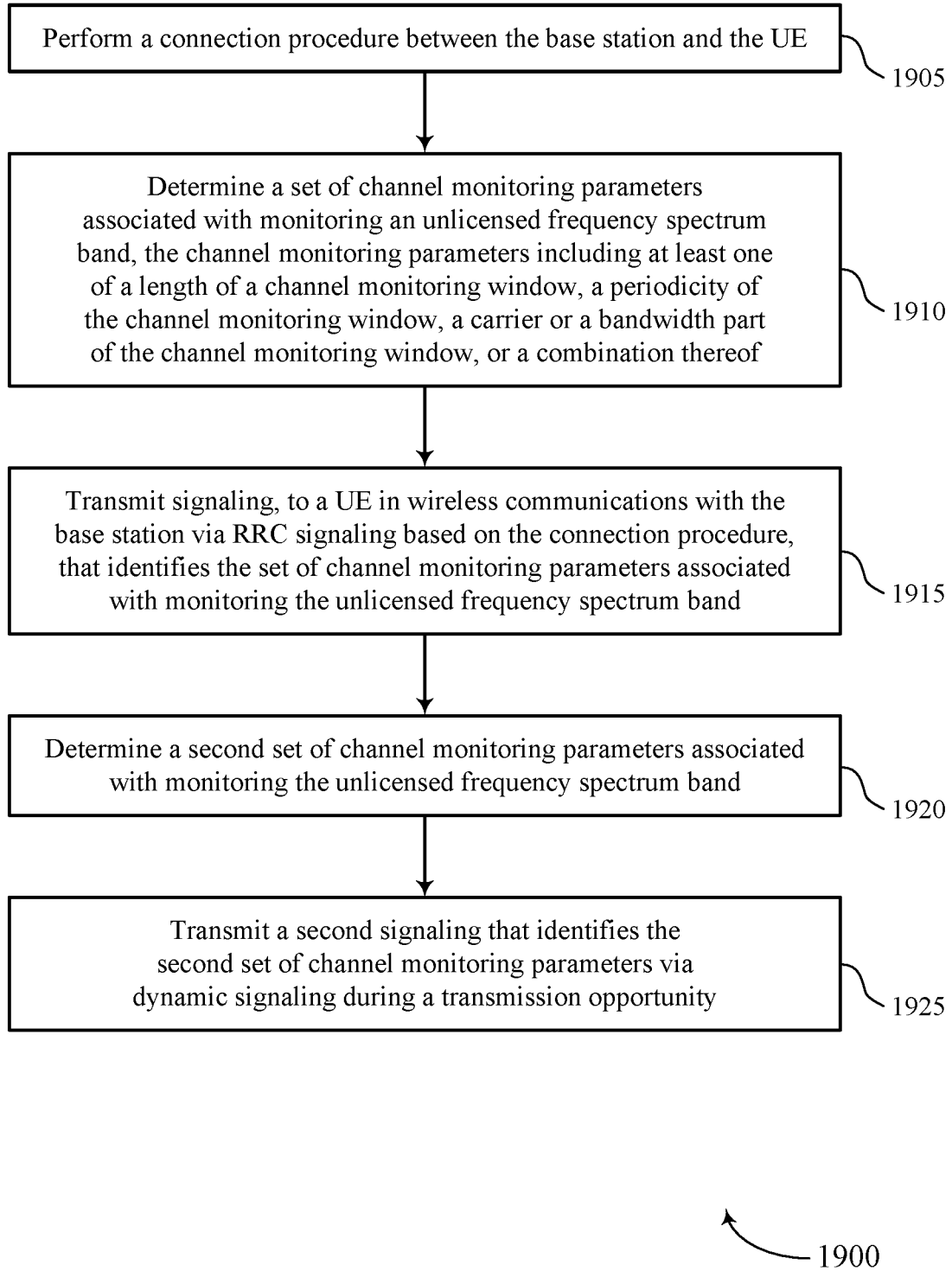

FIG. 19 shows a flowchart illustrating a method 1900 that supports adaptation of channel monitoring for unlicensed frequency spectrum band operation in accordance with aspects of the present disclosure. The operations of method 1900 may be implemented by a base station 105 or its components as described herein. For example, the operations of method 1900 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1905, the base station may perform a connection procedure between the base station and the UE. The operations of 1905 may be performed according to the methods described herein. In some examples, aspects of the operations of 1905 may be performed by a connection component as described with reference to FIGS. 10 through 13.

At 1910, the base station may determine a set of channel monitoring parameters associated with monitoring an unlicensed frequency spectrum band, the set of channel monitoring parameters including at least one of a length of a channel monitoring window, a periodicity of the channel monitoring window, a carrier or a bandwidth part of the channel monitoring window, or a combination thereof. The operations of 1910 may be performed according to the methods described herein. In some examples, aspects of the operations of 1910 may be performed by a monitoring component as described with reference to FIGS. 10 through 13.

At 1915, the base station may transmit signaling, to a UE in wireless communications with the base station via RRC signaling based on the connection procedure, that identifies the set of channel monitoring parameters associated with monitoring the unlicensed frequency spectrum band. The operations of 1915 may be performed according to the methods described herein. In some examples, aspects of the operations of 1915 may be performed by a signaling component as described with reference to FIGS. 10 through 13.

At 1920, the base station may determine a second set of channel monitoring parameters associated with monitoring the unlicensed frequency spectrum band. The operations of 1920 may be performed according to the methods described herein. In some examples, aspects of the operations of 1920 may be performed by a monitoring component as described with reference to FIGS. 10 through 13.

At 1925, the base station may transmit a second signaling that identifies the second set of channel monitoring parameters via dynamic signaling during a transmission opportunity. The operations of 1925 may be performed according to the methods described herein. In some examples, aspects of the operations of 1925 may be performed by a signaling component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Example 1 is a method of wireless communications at a UE that includes receiving signaling from a base station that identifies a set of channel monitoring parameters associated with monitoring an unlicensed frequency spectrum band, the set of channel monitoring parameters comprising at least one of a length of a channel monitoring window, a periodicity of the channel monitoring window, a carrier or a bandwidth part of the channel monitoring window, or a combination thereof; identifying a termination of a transmission opportunity in the unlicensed frequency spectrum band; and monitoring the unlicensed frequency spectrum band following the termination of the transmission opportunity using the set of channel monitoring parameters.

In Example 2, receiving the signaling of example 1 includes performing a connection procedure between the UE and the base station, and receiving the signaling via radio resource control signaling based at least in part on the connection procedure, wherein the set of channel monitoring parameters are UE-specific.

In Example 3, the method of any of examples 1 and 2 further includes receiving signaling that identifies a second set of channel monitoring parameters via dynamic signaling during the transmission opportunity, and monitoring the unlicensed frequency spectrum band based at least in part on at least one channel monitoring parameter of the second set of channel monitoring parameters.

In Example 4, the method of any of examples 1 through 3 further includes that the signaling is received dynamically during the transmission opportunity.

In Example 5, the method of any of examples 1 through 4 further includes that the dynamic signaling includes a downlink control information or a MAC CE.

In Example 6, monitoring the unlicensed frequency spectrum band of example 1 includes selecting at least one channel monitoring parameter of the set of channel monitoring parameters based at least in part on UE assistance information, where monitoring the unlicensed frequency spectrum band is further based at least in part on the selected channel monitoring parameter.

In Example 7, receiving the signaling that identifies the set of channel monitoring parameters of example 1 includes determining UE assistance information and transmitting the UE assistance information to the base station, where receiving the signaling that identifies the set of channel monitoring parameters is further based at least in part on the UE assistance information.

In Example 8, receiving the signaling that identifies the set of channel monitoring parameters of example 7 includes identifying a traffic load related to the wireless communications with the base station and indicating the traffic load related to the wireless communications with the base station in the UE assistance information, where receiving the signaling that identifies the set of channel monitoring parameters is based at least in part on the traffic load.

In Example 9, receiving the signaling that identifies the set of channel monitoring parameters of example 7 includes identifying a power status of the UE and indicating the power status of the UE in the UE assistance information, where receiving the signaling that identifies the set of channel monitoring parameters is based at least in part on the power status of the UE.

In Example 10, the method of any of examples 1 through 9 further includes that the signaling includes an index mapping to a lookup entry in a set of lookup entries, wherein the set of lookup entries includes the set of channel monitoring parameters.

In Example 11, the method of any of examples 1 through 10 further includes that the set of channel monitoring parameters is based at least in part on a group UE-common configuration or a UE-specific configuration.

In Example 12, the method of any of examples 1 through 11 further includes that the set of channel monitoring windows includes at least one of a set of PDCCH monitoring occasions, a set of initial signal monitoring occasions, a set of reference signal monitoring occasions, a set of beacon signal monitoring occasions, or a set of wakeup signal monitoring occasions.

In Example 13, the method of any of examples 1 through 12 further includes monitoring a control channel of the unlicensed frequency spectrum band.

Example 14 is a system or apparatus including means for implementing a method or realizing an apparatus as in any of examples 1 through 13.

Example 15 is a non-transitory computer-readable medium storing instructions executable by one or more processors to cause the one or more processors to implement a method as in any of examples 1 through 13.

Example 16 is a system including one or more processors and memory in electronic communication with the one or more processors storing instructions executable by the one or more processors to cause the system or apparatus to implement a method as in any of examples 1 through 13.

Example 17 is a method of wireless communications at a base station that includes determining a set of channel monitoring parameters associated with monitoring an unlicensed frequency spectrum band, the set of channel monitoring parameters comprising at least one of a length of a channel monitoring window, a periodicity of the channel monitoring window, a carrier or a bandwidth part of the channel monitoring window, or a combination thereof; and transmitting signaling, to a UE in wireless communications with the base station during a transmission opportunity, that identifies the set of channel monitoring parameters associated with monitoring the unlicensed frequency spectrum band.

In Example 18, the method of example 17 includes performing a connection procedure between the base station and the UE, and transmitting the signaling via radio resource control signaling based at least in part on the connection procedure, where the set of channel monitoring parameters are UE-specific.

In Example 19, the method of any of examples 17 and 18 further includes determining a second set of channel monitoring parameters associated with monitoring the unlicensed frequency spectrum band; and transmitting a second signaling that identifies the second set of channel monitoring parameters via dynamic signaling during the transmission opportunity.

In Example 20, the method of any of examples 17 through 19 further includes that the signaling is transmitted dynamically during the transmission opportunity.

In Example 21, the method of any of examples 17 through 20 further includes that dynamic signaling includes a downlink control information or a MAC CE.

In Example 22, the method of any of examples 17 through 21 further includes receiving UE assistance information, where determining the set of channel monitoring parameters associated with monitoring the unlicensed frequency spectrum band is further based at least in part on the UE assistance information.

In Example 23, the method of any of examples 17 through 22 further includes identifying a traffic load related to the wireless communications with the UE based at least in part on the UE assistance information, where determining the set of channel monitoring parameters associated with monitoring the unlicensed frequency spectrum band is further based at least in part on the traffic load.

In Example 24, the method of any of examples 17 through 23 further includes identifying a power status of the UE based at least in part on the UE assistance information, where determining the set of channel monitoring parameters associated with monitoring the unlicensed frequency spectrum band is further based at least in part on the power status of the UE.

In Example 25, the method of any of examples 17 through 24 further includes that the set of channel monitoring parameters is based at least in part on a group UE-common configuration or a UE-specific configuration.

In Example 26, the method of any of examples 17 through 25 further includes that the signaling includes an index mapping to a lookup entry in a set of lookup entries, wherein the set of lookup entries includes the set of channel monitoring parameters.

In Example 27, the method of any of examples 17 through 26 further includes that the set of channel monitoring windows includes at least one of a set of PDCCH monitoring occasions, a set of initial signal monitoring occasions, a set of reference signal monitoring occasions, a set of beacon signal monitoring occasions, or a set of wakeup signal monitoring occasions.

Example 28 is a system or apparatus including means for implementing a method or realizing an apparatus as in any of examples 17 through 26.

Example 29 is a non-transitory computer-readable medium storing instructions executable by one or more processors to cause the one or more processors to implement a method as in any of examples 17 through 26.

Example 30 is a system including one or more processors and memory in electronic communication with the one or more processors storing instructions executable by the one or more processors to cause the system or apparatus to implement a method as in any of examples 17 through 26.

Aspects of these examples may be combined with aspects or embodiments disclosed in other implementations.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    receiving signaling from a base station that identifies a set of channel monitoring parameters associated with monitoring an unlicensed frequency spectrum band, the set of channel monitoring parameters comprising a length of a channel monitoring window, a periodicity of the channel monitoring window, and a bandwidth part of the channel monitoring window;
    identifying a termination of a transmission opportunity in the unlicensed frequency spectrum band; and
    monitoring the unlicensed frequency spectrum band following the termination of the transmission opportunity and before a subsequent transmission opportunity using the set of channel monitoring parameters.

2. The method of claim 1, further comprising:
    receiving signaling that identifies a second set of channel monitoring parameters via dynamic signaling during the subsequent transmission opportunity; and
    monitoring the unlicensed frequency spectrum band based at least in part on at least one channel monitoring parameter of the second set of channel monitoring parameters.

3. The method of claim 1, wherein the signaling is received dynamically during the transmission opportunity.

4. The method of claim 3, wherein the dynamic signaling comprises a downlink control information or a medium access control (MAC) control element (CE).

5. The method of claim 1, wherein the set of channel monitoring windows comprises at least one of a set of physical downlink control channel (PDCCH) monitoring occasions, a set of initial signal monitoring occasions, a set of reference signal monitoring occasions, a set of beacon signal monitoring occasions, or a set of wakeup signal monitoring occasions.

6. The method of claim 1, wherein monitoring the unlicensed frequency spectrum band further comprises:
    monitoring a control channel of the unlicensed frequency spectrum band.

7. The method of claim 1, wherein the set of channel monitoring parameters is based at least in part on a group UE-common configuration or a UE-specific configuration.

8. The method of claim 1, wherein receiving the signaling comprises:
    performing a connection procedure between the UE and the base station; and
    receiving the signaling via radio resource control signaling based at least in part on the connection procedure, wherein the set of channel monitoring parameters are UE-specific.

9. The method of claim 1, further comprising:
    selecting at least one channel monitoring parameter of the set of channel monitoring parameters based at least in part on UE assistance information, wherein monitoring the unlicensed frequency spectrum band is further based at least in part on the selected channel monitoring parameter.

10. The method of claim 1, further comprising:
    determining UE assistance information; and
    transmitting the UE assistance information to the base station, wherein receiving the signaling that identifies the set of channel monitoring parameters is further based at least in part on the UE assistance information.

11. The method of claim 10, further comprising:
    identifying a traffic load related to the wireless communications with the base station; and
    indicating the traffic load related to the wireless communications with the base station in the UE assistance information, wherein receiving the signaling that identifies the set of channel monitoring parameters is based at least in part on the traffic load.

12. The method of claim 10, further comprising:
    identifying a power status of the UE; and
    indicating the power status of the UE in the UE assistance information, wherein receiving the signaling that identifies the set of channel monitoring parameters is based at least in part on the power status of the UE.

13. The method of claim 1, wherein the signaling comprises one or more of:
    an index mapping to a lookup entry in a set of lookup entries, wherein the set of lookup entries comprises the set of channel monitoring parameters; or radio resource control (RRC) signaling received during the transmission opportunity.

14. A method for wireless communications at a base station, comprising:

determining a set of channel monitoring parameters associated with monitoring an unlicensed frequency spectrum band following a termination of a transmission opportunity and before a subsequent transmission opportunity, the set of channel monitoring parameters comprising a length of a channel monitoring window, a periodicity of the channel monitoring window, and a bandwidth part of the channel monitoring window; and transmitting signaling, to a user equipment (UE) in wireless communications with the base station during the transmission opportunity, that identifies the set of channel monitoring parameters associated with monitoring the unlicensed frequency spectrum band.

15. The method of claim 14, further comprising:

determining a second set of channel monitoring parameters associated with monitoring the unlicensed frequency spectrum band; and transmitting a second signaling that identifies the second set of channel monitoring parameters via dynamic signaling during the subsequent transmission opportunity.

16. The method of claim 14, wherein the set of channel monitoring windows comprises at least one of a set of physical downlink control channel (PDCCH) monitoring occasions, a set of initial signal monitoring occasions, a set of reference signal monitoring occasions, a set of beacon signal monitoring occasions, or a set of wakeup signal monitoring occasions.

17. The method of claim 14, further comprising:

performing a connection procedure between the base station and the UE; and transmitting the signaling via radio resource control signaling based at least in part on the connection procedure, wherein the set of channel monitoring parameters are UE-specific.

18. The method of claim 14, wherein the signaling is transmitted dynamically during the transmission opportunity.

19. The method of claim 18, wherein the dynamic signaling comprises a downlink control information or a medium access control (MAC) control element (CE).

20. The method of claim 14, further comprising:

receiving UE assistance information, wherein determining the set of channel monitoring parameters associated with monitoring the unlicensed frequency spectrum band is further based at least in part on the UE assistance information.

21. The method of claim 20, further comprising:

identifying a traffic load related to the wireless communications with the UE based at least in part on the UE assistance information, wherein determining the set of channel monitoring parameters associated with monitoring the unlicensed frequency spectrum band is further based at least in part on the traffic load.

22. The method of claim 20, further comprising:

identifying a power status of the UE based at least in part on the UE assistance information, wherein determining the set of channel monitoring parameters associated with monitoring the unlicensed frequency spectrum band is further based at least in part on the power status of the UE.

23. The method of claim 14, wherein the set of channel monitoring parameters is based at least in part on a group UE-common configuration or a UE-specific configuration.

24. The method of claim 14, wherein the signaling comprises one or more of:

an index mapping to a lookup entry in a set of lookup entries, wherein the set of lookup entries comprises the set of channel monitoring parameters; or radio resource control (RRC) signaling received during the transmission opportunity.

25. An apparatus for wireless communications, comprising: a processor, memory in electronic communication with the processor; and instructions stored in the memory and executable by the processor to cause the apparatus to:

receive signaling from a base station that identifies a set of channel monitoring parameters associated with monitoring an unlicensed frequency spectrum band, the set of channel monitoring parameters comprising a length of a channel monitoring window, a periodicity of the channel monitoring window, and a bandwidth part of the channel monitoring window;

identify a termination of a transmission opportunity in the unlicensed frequency spectrum band; and monitor the unlicensed frequency spectrum band following the termination of the transmission opportunity and before a subsequent transmission opportunity using the set of channel monitoring parameters.

26. The apparatus of claim 25, wherein the instructions are further executable by the processor to cause the apparatus to:

receive signaling that identifies a second set of channel monitoring parameters via dynamic signaling during the subsequent transmission opportunity; and monitor the unlicensed frequency spectrum band based at least in part on at least one channel monitoring parameter of the second set of channel monitoring parameters.

27. The apparatus of claim 25, wherein the signaling is received dynamically during the transmission opportunity.

28. An apparatus for wireless communications, comprising: a processor, memory in electronic communication with the processor; and instructions stored in the memory and executable by the processor to cause the apparatus to:

determine a set of channel monitoring parameters associated with monitoring an unlicensed frequency spectrum band following a termination of a transmission opportunity and before a subsequent transmission opportunity, the set of channel monitoring parameters comprising a length of a channel monitoring window, a periodicity of the channel monitoring window, and a bandwidth part of the channel monitoring window; and transmit signaling, to a user equipment (UE) in wireless communications with the apparatus during the transmission opportunity, that identifies the set of channel monitoring parameters associated with monitoring the unlicensed frequency spectrum band.

29. The apparatus of claim 28, wherein the instructions are further executable by the processor to cause the apparatus to:

determine a second set of channel monitoring parameters associated with monitoring the unlicensed frequency spectrum band; and transmit a second signaling that identifies the second set of channel monitoring parameters via dynamic signaling during the subsequent transmission opportunity.

30. The apparatus of claim 28, wherein the signaling is transmitted dynamically during the transmission opportunity.

\* \* \* \* \*